(12) United States Patent
Matsui et al.

(10) Patent No.: US 10,490,855 B2
(45) Date of Patent: Nov. 26, 2019

(54) ELECTROCHEMICAL ENERGY STORAGE DEVICE

(71) Applicants: PANASONIC CORPORATION, Osaka (JP); TOYOTA JIDOSHA KABUSHIKI KAISHA, Aichi-ken (JP); KYOTO UNIVERSITY, Kyoto (JP)

(72) Inventors: Toru Matsui, Osaka (JP); Koji Suto, Shizuoka (JP); Toshiro Hirai, Tokyo (JP); Jun-ichi Yamaki, Kyoto (JP); Zempachi Ogumi, Kyoto (JP)

(73) Assignees: PANASONIC CORPORATION, Osaka (JP); TOYOTA JIDOSHA KABUSHIKI KAISHA, Aichi (JP); KYOTO UNIVERSITY, Kyoto (JP)

( * ) Notice: Subject to any disclaimer, the term of this patent is extended or adjusted under 35 U.S.C. 154(b) by 278 days.

(21) Appl. No.: 14/652,438

(22) PCT Filed: Jul. 2, 2014

(86) PCT No.: PCT/JP2014/003522
§ 371 (c)(1),
(2) Date: Jun. 15, 2015

(87) PCT Pub. No.: WO2015/001803
PCT Pub. Date: Jan. 8, 2015

(65) Prior Publication Data
US 2015/0325883 A1 Nov. 12, 2015

(30) Foreign Application Priority Data
Jul. 5, 2013 (JP) ................. 2013-141960

(51) Int. Cl.
*H01M 10/0569* (2010.01)
*H01M 4/58* (2010.01)
(Continued)

(52) U.S. Cl.
CPC ........ *H01M 10/0569* (2013.01); *H01G 11/62* (2013.01); *H01G 11/64* (2013.01);
(Continued)

(58) Field of Classification Search
None
See application file for complete search history.

(56) References Cited

U.S. PATENT DOCUMENTS 6,270,923 B1 *  8/2001  Bito ............... H01M 4/136
                                              429/218.1
2004/0094741 A1 *  5/2004  Sato ............... C07C 217/08
                                              252/1
(Continued)

FOREIGN PATENT DOCUMENTS

CN     102694205 A    9/2012
CN     103140963 A    6/2013
(Continued)

OTHER PUBLICATIONS

Machine translation of JP 2004-47416, Feb. 2004.*
(Continued)

*Primary Examiner* — Jonathan Crepeau
(74) *Attorney, Agent, or Firm* — McDermott Will & Emery LLP

(57) ABSTRACT

The present application provides an electrochemical energy storage device with a desirable reaction reversibility by using a metal halide as an electrode active material. The electrochemical energy storage device disclosed herein includes: a positive electrode; a negative electrode; and a non-aqueous electrolyte in contact with the positive electrode and the negative electrode, wherein: at least one of the positive electrode and the negative electrode contains a metal halide as an electrode active material; and the non-
(Continued)

aqueous electrolyte contains, as a solvent, an ionic liquid of which a component is a cation having an alkoxyalkyl group.

16 Claims, 7 Drawing Sheets

(51) Int. Cl.
  *H01M 10/052* (2010.01)
  *H01M 10/0568* (2010.01)
  *H01G 11/62* (2013.01)
  *H01G 11/64* (2013.01)
(52) U.S. Cl.
  CPC ......... *H01M 4/582* (2013.01); *H01M 10/052* (2013.01); *H01M 10/0568* (2013.01); *H01M 2300/0028* (2013.01); *H01M 2300/0045* (2013.01); *Y02E 60/13* (2013.01); *Y02T 10/7011* (2013.01); *Y02T 10/7022* (2013.01)

(56) References Cited

U.S. PATENT DOCUMENTS

| | | |
|---|---|---|
| 2006/0034035 A1 | 2/2006 | Maruo et al. |
| 2009/0053597 A1 | 2/2009 | Tsunashima et al. |
| 2010/0316908 A1* | 12/2010 | Yoshimura ........ H01M 10/0525 429/207 |
| 2012/0082901 A1 | 4/2012 | Schmidt et al. |
| 2012/0155001 A1* | 6/2012 | Fujikawa ............ H01M 2/0207 361/679.01 |
| 2012/0171577 A1* | 7/2012 | Ryu ........................ H01M 4/38 429/326 |
| 2014/0011099 A1 | 1/2014 | Yang et al. |
| 2015/0072248 A1* | 3/2015 | Watanabe ............... H01M 4/38 429/336 |

FOREIGN PATENT DOCUMENTS

| | | |
|---|---|---|
| JP | 2004-047416 A | 2/2004 |
| JP | 2004-111294 A | 4/2004 |
| JP | 2005-285632 A | 10/2005 |
| JP | 2006-092971 A | 4/2006 |
| JP | 2009-054311 A | 3/2009 |
| WO | 02/076924 A1 | 10/2002 |

OTHER PUBLICATIONS

George G. Totir et al., "XPS studies of the chemical and electrochemical behavior of copper in anhydrous hydrogen fluoride", Journal of Electroanalytical Chemistry, vol. 532 (2002), pp. 151-156.

International Search Report issued in International Application No. PCT/JP2014/003522 dated Oct. 7, 2014, with English Translation.

Chinese Office Action dated Jun. 30, 2017 issued in Chinese Patent Application No. 201480002318.1 (with English translation).

* cited by examiner

ELECTROCHEMICAL ENERGY STORAGE DEVICE

RELATED APPLICATIONS

This application is a national phase of International Application No. PCT/JP2014/003522, filed on Jul. 2, 2014, which in turn claims the benefit of Japanese Application No. 2013-141960, filed on Jul. 5, 2013, the disclosures of which Applications are incorporated by reference herein.

TECHNICAL FIELD

The present disclosure relates to an electrochemical energy storage device.

BACKGROUND ART

In recent years, there have been more and more researches and developments on how to increase the energy density of a non-aqueous electrolyte secondary battery or a hybrid capacitor. Non-aqueous electrolyte secondary batteries, and the like, are used as power sources for electronic devices such as smartphones, mobile telephones, portable information devices, laptop computers, video cameras and portable game devices, as driving power sources for electric tools, vacuum cleaners, robots, etc., and as power sources for driving or assisting electric motors in electric vehicles, hybrid electric vehicles, plug-in hybrid electric vehicles, fuel-cell vehicles, etc.

One way of increasing the energy density of a non-aqueous electrolyte secondary battery, or the like, is to use a material having a large electrical capacity as an active material of an electrode. For example, where copper fluoride ($CuF_2$) is used as a positive electrode active material and lithium metal as a negative electrode active material, it is possible to obtain an electrical capacity of 528 mAh/g through a reaction as shown in Equation 1. This value is greater than five times the electrical capacitance of $Li_{0.5}CoO_2$, which has now been used as a positive electrode active material of lithium-ion batteries. Note that the potential indicated preceding Equation 1 is a value calculated based on the standard free energies of formation with copper fluoride and lithium fluoride.

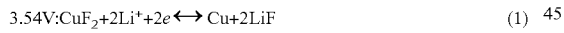

$$3.54V: CuF_2 + 2Li^+ + 2e^- \leftrightarrow Cu + 2LiF \quad (1)$$

Such a reaction is known as a conversion reaction. Where copper chloride ($CuCl_2$) is used as a positive electrode active material, it is theoretically possible to obtain an electrical capacity as high as 399 mAh/g. With copper chloride, the following reactions are possible, as opposed to Equation 1.

$$3.40V: CuCl_2 + Li^+ + e^- \leftrightarrow CuCl + LiCl \quad (2)$$

$$3.07V: CuCl_2 + 2Li^+ + 2e^- \leftrightarrow Cu + 2LiCl \quad (3)$$

$$2.74V: CuCl + Li^+ + e^- \leftrightarrow Cu + LiCl \quad (4)$$

Patent Document No. 1 discloses a non-aqueous electrolyte secondary battery in which copper fluoride or copper chloride is used as a positive electrode active material, and fluorinated solvent is used as the solvent of the non-aqueous electrolyte. Specifically, it is stated that a reaction of Equation 4 occurs following Equation 2, by using trifluoro propylene carbonate (abbreviated as TFPC) as the fluorinated solvent, and using a non-aqueous electrolyte in which lithium hexafluorophosphate ($LiPF_6$) is dissolved at a concentration of 1 M and lithium chloride (LiCl) is dissolved at a concentration of 2.4 mM (specified in Patent Document No. 1 as 100 mg/liter) as electrolyte salts. Now, the reason for using TFPC is to prevent excessive dissolution of copper fluoride or copper chloride in the electrolyte.

Patent Document No. 2 discloses a non-aqueous electrolyte primary battery in which copper fluoride or copper chloride is used as a positive electrode active material. An ionic liquid (specified in Patent Document No. 2 as "ambient temperature molten salt") made of an organic cation and an anion is used as the solvent of the non-aqueous electrolyte, and an alkali metal ion and a chlorine ion ($Cl^-$) are listed as an example of the cation and the anion, respectively, of the electrolyte salt.

Patent Document No. 3 discloses a non-aqueous electrolyte in which lithium tetrafluoroborate ($LiBF_4$), lithium hexafluorophosphate ($LiPF_6$), lithium bis(trifluoromethanesulfonyl)imide ($Li(CF_3SO_2)_2N$), or the like, is dissolved as an electrolyte salt in an ionic liquid (specified in Patent Document No. 3 as "ionic liquid") made of an organic cation and an anion having an alkoxyalkyl group.

CITATION LIST

Patent Literature

[Patent Document No. 1] Japanese Laid-Open Patent Publication No. 2004-47416

[Patent Document No. 2] Japanese Laid-Open Patent Publication No. 2005-285632

[Patent Document No. 3] Japanese Laid-Open Patent Publication No. 2004-111294

SUMMARY OF INVENTION

Technical Problem

However, with the conventional techniques described above, there was a demand for a better reaction reversibility, i.e., a better charging/discharging reversibility, in a secondary battery in which a metal halide is used as an electrode active material. A non-limiting example embodiment hereof provides an electrochemical energy storage device with a desirable reaction reversibility by using a metal halide as an electrode active material.

Solution to Problem

An electrochemical energy storage device according to one embodiment hereof includes: a positive electrode; a negative electrode; and a non-aqueous electrolyte in contact with the positive electrode and the negative electrode, wherein at least one of the positive electrode and the negative electrode contains a metal halide as an electrode active material; and the non-aqueous electrolyte contains, as a solvent, an ionic liquid of which a component is a cation having an alkoxyalkyl group.

Advantageous Effects of Invention

With the electrochemical energy storage device disclosed herein, since it includes a non-aqueous electrolyte containing, as a solvent, an ionic liquid of which a component is a cation having an alkoxyalkyl group, a reversible redox reaction of the metal halide, which is the electrode active material, proceeds smoothly. Therefore, it is possible to realize an electrochemical energy storage device including desirable characteristics.

DESCRIPTION OF EMBODIMENTS

Figure 1:
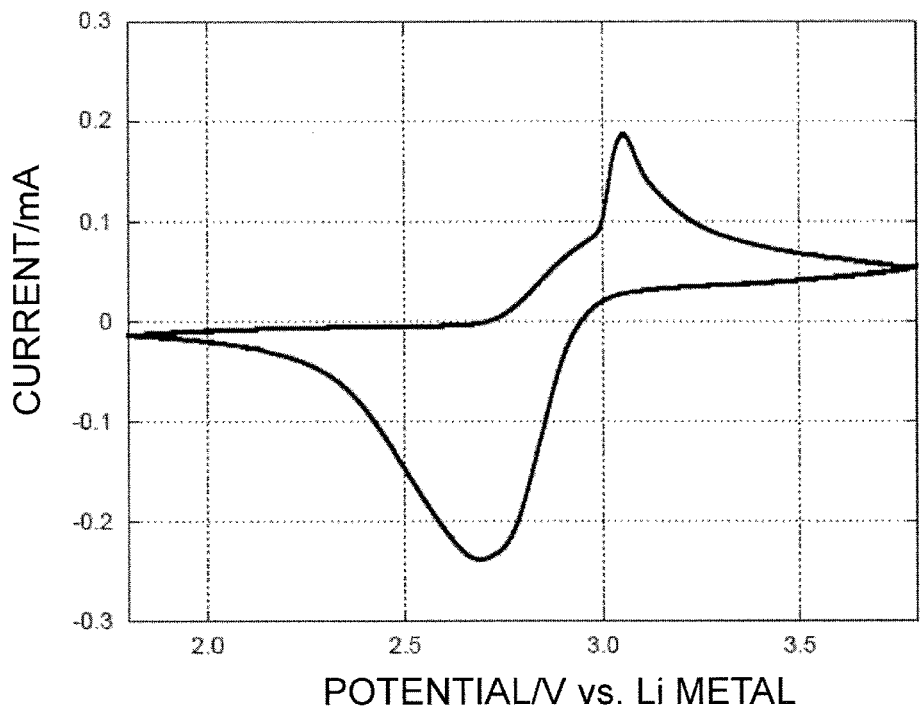
FIG. 1 A graph representing a potential-current change observed in a cyclic voltammetry with a silver wire in an LiCl/DEME.BF$_4$ solution.

The present inventors made an in-depth study on secondary batteries, etc., disclosed in Patent Document Nos. 1 to 3. As a result, it was found that with the secondary battery disclosed in Patent Document No. 1, the leftward reaction in Equations 1 to 4 above, i.e., the charging reaction, does not proceed easily. Lithium halide, which is a discharge product, is not easily soluble in a non-aqueous electrolyte solution. In Patent Document No. 1, the secondary battery is charged to as high as 4 V or more, and it is disclosed that there is produced CuCl$_2$, for example. As the present inventors examined this, however, it turned out that a reaction of Equation 5 below is occurring at a potential that is generally equal to the theoretical potential of formation of CuCl$_2$. Therefore, in order for copper fluoride or copper chloride to be produced by charging, i.e., for the leftward reaction in Equations 1 to 4 to proceed, it is necessary that lithium halide, which is a discharge product, dissolves in a non-aqueous electrolyte to realize a state where a halogen ion such as F$^-$ or Cl$^-$ has a high electrochemical reactivity.

$$Cu + 2PF_6^- \leftrightarrow Cu(PF_6)_2 + 2e \quad (5)$$

As illustrated in Patent Document No. 1, the solubility of lithium fluoride in an organic solvent is very low. Therefore, it is generally difficult to prepare a non-aqueous electrolyte in which an electrochemically-reactive fluorine ion (F$^-$) is present at a high concentration, and it is difficult to make the reaction of Equation 1 above to proceed leftward (corresponding to charging for batteries).

George G. Totir, Gary S. Chottiner, Christopher L. Gross, and Daniel A. Scherson, "XPS studies of the chemical and electrochemical behavior of copper in anhydrous hydrogen fluoride", Journal of Electroanalytical Chemistry, the Netherlands, Elsevier, issued in 2002, Vol. 532, pp. 151-156 (a non-patent document) discloses preparing an electrolyte obtained by dissolving about 5% by volume of anhydrous hydrofluoric acid in hydrogen-active hexafluoro butanol, electrochemically fluorinating metal copper, and reducing it back to metal copper. However, no examples are found where a hydrogen-inactive solvent, which can be used in non-aqueous electrolyte secondary batteries, is used to prepare an electrolyte in which an electrochemically-reactive fluorine ion (F$^-$) is dissolved.

Patent Document No. 2 is directed to a primary battery, and fails to specifically describe the charging/discharging reversibility, and the structure of an ionic liquid in which an alkali metal halide is dissolved. It also fails to describe the concentration at which a chlorine ion can exist, and whether the chlorine ion is electrochemical reactive.

Patent Document No. 3 also fails to describe an ionic liquid in which a lithium halide, such as lithium chloride (LiCl), can be dissolved.

Where a metal chloride, such as copper chloride (CuCl$_2$), is used as an active material, there is another problem. As stated in Patent Document No. 1, even if one attempts to use it as a positive electrode active material of a non-aqueous electrolyte secondary battery, a metal chloride has a high solubility in an organic solvent, and moreover, a metal chloride dissolves as a complex ion as shown in Equation 6, thus leading to self-discharge. The more there is a chlorine ion (Cl$^-$) having a high chemical reactivity in the electrolyte, the more rightward the reaction of Equation 6 proceeds. Since the reduction potential of a complex ion is lower than the original metal chloride, it is not possible to obtain an expected energy density. This is similarly true also with a metal fluoride.

$$CuCl_2 + 2Cl^- \rightarrow CuCl_4^{2-} \quad (6)$$

Thus, it has been found that where a metal halide is used as a positive electrode active material, since an alkali metal halide, such as lithium chloride (LiCl), which is a discharge product, is not easily soluble, and since a reaction with another anion such as coexisting hexafluorophosphate ion (PF$_6^-$) occurs, it is difficult for it to return to the original metal halide through charging. On the other hand, a metal halide, particularly, a metal chloride, has a high solubility in an organic solvent, and if it is combined with an electrolyte in which an alkali metal halide is dissolved and which produces a large amount of halogen ion, the metal halide will become a complex ion, giving an even higher solubility. Therefore, it has been found that where a metal halide is used in a secondary battery, self-discharge is likely to occur.

In view of such problems, the present inventors have conceived readdressing the composition of the non-aqueous electrolyte so as to improve the reaction reversibility of a metal halide to be an electrode active material. An outline of an electrochemical energy storage device according to one embodiment hereof is as follows.

An electrochemical energy storage device according to one embodiment hereof includes: a positive electrode; a negative electrode; and a non-aqueous electrolyte in contact with the positive electrode and the negative electrode, wherein at least one of the positive electrode and the negative electrode contains a metal halide as an electrode active material; and the non-aqueous electrolyte contains, as a solvent, an ionic liquid of which a component is a cation having an alkoxyalkyl group.

The cation of the ionic liquid may contain at least one selected from the group consisting of diethyl-methyl-2-methoxy ethyl ammonium ion $((C_2H_5)_2(CH_3)(CH_3OCH_2CH_2)N^+)$, diethyl-methyl-2-methoxy propyl ammonium ion $((C_2H_5)_2(CH_3)(CH_3OCH_2CH_2CH_2)N^+)$, ethyl dimethyl-(2-methoxyethyl) ammonium ion $((C_2H_5)(CH_3)_2(CH_3OCH_2CH_2)N^+)$, ethyl dimethyl-(2-methoxy propyl) ammonium ion $((C_2H_5)(CH_3)_2(CH_3OCH_2CH_2CH_2)N^+)$, methyl-2-methoxy ethylpyrrolidinium ion $((CH_3)(CH_3OCH_2CH_2)N^+(CH_2)_4)$, methyl-2-methoxy propyl pyrrolidinium ion $((CH_3)(CH_3OCH_2CH_2CH_2)N^+(CH_2)_4)$, ethyl-(2-methoxy-ethyl) pyrrolidinium ion $((C_2H_5)(CH_3OCH_2CH_2)N^+(CH_2)_4)$, ethyl-(2-methoxy propyl) pyrrolidinium $((C_2H_5)(CH_3OCH_2CH_2CH_2)N^+(CH_2)_4)$, methyl-2-methoxy-ethyl piperidinium ion $((CH_3)(CH_3OCH_2CH_2)N^+(CH_2)_5)$, methyl-2-methoxy propyl piperidinium ion $((CH_3)(CH_3OCH_2CH_2CH_2)N^+(CH_2)_5)$, ethyl-(2-methoxyethyl) piperidinium ion $((C_2H_5)(CH_3OCH_2CH_2)N^+(CH_2)_5)$, and ethyl-(2-methoxy propyl) piperidinium $((C_2H_5)(CH_3OCH_2CH_2CH_2)N^+(CH_2)_5)$.

The cation of the ionic liquid may contain at least one selected from the group consisting of diethyl-methyl-2-methoxy ethyl ammonium ion $((C_2H_5)_2(CH_3)(CH_2OCH_2CH_2)N^+)$, methyl-2-methoxy ethylpyrrolidinium ion $((CH_3)(CH_3OCH_2CH_2)N^+(CH_2)_4)$, and methyl-2-methoxy-ethyl piperidinium ion $((CH_3)(CH_2OCH_2CH_2)N^+(CH_2)_5)$.

The cation of the ionic liquid may contain diethyl-methyl-2-methoxy ethyl ammonium ion $((C_2H_5)_2(CH_3)(CH_3OCH_2CH_2)N^+)$.

An anion of the ionic liquid may be tetrafluoroborate ion $(BF_4^-)$

An anion of the ionic liquid may be bis(trifluoromethanesulfonyl)imide ion $((CF_3SO_2)_2N^-)$.

The non-aqueous electrolyte may contain an alkali metal halide dissolved in the ionic liquid.

The alkali metal halide may be lithium fluoride (LiF).

The alkali metal halide may be lithium chloride (LiCl).

The non-aqueous electrolyte may contain an alkaline earth metal halide dissolved in the ionic liquid.

The alkaline earth metal halide may be magnesium chloride ($MgCl_2$).

The metal halide may be a metal fluoride.

The metal fluoride may be copper fluoride ($CuF_2$).

The metal halide may be a metal chloride.

The metal chloride may contain at least one of cuprous chloride (CuCl) and cupric chloride ($CuCl_2$).

The metal chloride may be bismuth chloride ($BiCl_3$).

The metal chloride may be magnesium chloride ($MgCl_2$).

An embodiment of the electrochemical energy storage device of the present invention will now be described in detail. The electrochemical energy storage device is a generic term including devices capable of repeatedly storing an electric charge through charging and discharging, such as secondary batteries, capacitors, and hybrid capacitors, and primary batteries.

An electrochemical energy storage device of the present embodiment includes a positive electrode, a negative electrode, and a non-aqueous electrolyte positioned between the positive electrode and the negative electrode to be in contact therewith. At least one of the positive electrode and the negative electrode includes a metal halide as an electrode active material. As a metal halide undergoes charging/discharging, the metal is reduced, and the released halogen ion forms a salt with an alkali metal or an alkaline earth metal. The non-aqueous electrolyte is capable of readily dissolving the produced alkali metal halide or alkaline earth metal halide, and the halogen ion is electrochemically active in the non-aqueous electrolyte. Therefore, the charging/discharging reaction of the electrochemical energy storage device for producing a metal halide from the reduced metal and the halogen ion in the non-aqueous electrolyte can proceed smoothly. Therefore, the electrochemical energy storage device of the present embodiment has a desirable reaction reversibility, and is capable of smoothly repeating charging/discharging. Elements of the present embodiment will now be described in detail.

1. Elements of Electrochemical Energy Storage Device (1) Non-Aqueous Electrolyte The non-aqueous electrolyte of the present embodiment contains, as a solvent, an ionic liquid of which a component is a cation having an alkoxyalkyl group. The non-aqueous electrolyte may contain, as an electrolyte salt, at least one of an alkali metal halide and an alkaline earth metal halide dissolved in the ionic liquid.

The ionic liquid as used herein is a salt which is made of a cation and an anion and whose melting point is generally 100 C or less. This does not include a chloroaluminate molten salt using an anion such as $AlCl_4^-$ or $Al_2Cl_7^-$. An ionic liquid is also called an ion liquid or a molten salt.

Cations having an alkoxyalkyl group include quaternary ammonium ions. More specifically, cations having an alkoxyalkyl group include diethyl-methyl-2-methoxy ethyl ammonium ion $((C_2H_5)_2(CH_3)(CH_3OCH_2CH_2)N^+$, abbreviated as DEME), diethyl-methyl-2-methoxy propyl ammonium ion $((C_2H_5)_2(CH_3)(CH_3OCH_2CH_2CH_2)N^+)$, ethyl dimethyl-(2-methoxyethyl) ammonium ion $((C_2H_5)(CH_3)_2(CH_3OCH_2CH_2)$ abbreviated as MOEDEA), ethyl dimethyl-(2-methoxy propyl) ammonium ion $((C_2H_5)(CH_3)_2(CH_3OCH_2CH_2CH_2)N^+)$, etc. It may also be a cyclic quaternary ammonium ion. Quaternary ammonium ions having a five-membered ring include methyl-2-methoxy ethylpyrrolidinium ion $((CH_3)(CH_3OCH_2CH_2)N^+(CH_2)_4)$, methyl-2-methoxy propyl pyrrolidinium ion $((CH_3)(CH_3OCH_2CH_2CH_2)N^+(CH_2)_4)$, ethyl-(2-methoxyethyl) pyrrolidinium ion $((C_2H_5)(CH_3OCH_2CH_2)N^+(CH_2)_4)$, ethyl-(2-methoxy propyl) pyrrolidinium $((C_2H_5)(CH_3OCH_2CH_2CH_2)N^+(CH_2)_4)$, etc. It may be a six-membered ring piperidinium ion, instead of these five-membered ring ammonium ions. The ionic liquid includes at least one of these cations.

In order to more readily dissolve an alkali metal halide and an alkaline earth metal halide, it is preferred to use, among these quaternary ammonium ions, diethyl-methyl-2-methoxy ethyl ammonium ion $((C_2H_5)_2(CH_3)(CH_3OCH_2CH_2)N^+$, abbreviated as DEME), methyl-2-methoxy ethyl-pyrrolidinium ion $((CH_3)(CH_3OCH_2CH_2)N^+(CH_2)_4)$, or methyl-2-methoxy-ethyl piperidinium ion $((CH_3)(CH_3OCH_2CH_2)N^+(CH_2)_5)$.

The cation having an alkoxyalkyl group may be a phosphonium ion obtained by substituting N atoms in any of the quaternary ammonium ions above with P atoms.

The anion of the ionic liquid used in the present embodiment is a fluoro complex ion, for example. Where the nucleus is boron, fluoro complex ions include $BF_4^-$, $BF_x(CF_3)_y^-$ (x+y=4, where x is not 4), $BF_x(C_2F_5)_y^-$ (x+y=4, where x is not 4), $BF_x(C_3F_7)_y^-$ (x+y=4, where x is not 4), $BF_x(C_4F_9)_y^-$ (x+y=4, where x is not 4), etc. In these fluoro complex ions, two or more F's, or two or more perfluoroalkyl groups, or one or more combinations of one F and one perfluoroalkyl group, may be substituted with one or more oxalic acid ion residues (O—C(=O)—C(=O)—O). Among the fluoro complex ions of which the nucleus is boron, $BF_4^-$ is most preferred because it has a small formula weight and allows for a reduction in the electrolyte weight.

The anion of the ionic liquid may be a fluoro complex ion of which the nucleus is phosphorus. It includes $PF_6^-$, $PF_x(CF_3)_y^-$ (x+y=6, where x is not 6), $PF_x(C_2F_5)_y^-$ (x+y=6, where x is not 6; abbreviated as FAP when x=3), $PF_x(C_3F_7)_y^-$ (x+y=6, where x is not 6), $PF_x(C_4F_9)_y^-$ (x+y=6, where x is not 6), etc. In these fluoro complex ions, two or more F's, or two or more perfluoroalkyl groups, or one or more combinations of one F and one perfluoroalkyl group, may be substituted with one or more oxalic acid ion residues (O—C(=O)—C(=O)—O). Among the fluoro complex ions of which the nucleus is phosphorus, $PF_3(C_2F_5)_3$ is most preferred.

In addition to boron and phosphorus mentioned above, the nucleus species of the fluoro complex ion may be arsenic, antimony, etc.

The anion of the ionic liquid may be an imide ion. Chain imide ions include $(FSO_2)_2N^-$, $(FSO_2)(CF_3SO_2)N^-$, $(CF_3SO_2)_2N^-$ (abbreviated as $TFSI^-$), $(C_2F_5SO_2)_2N^-$, $(CF_3SO_2)(C_4F_9SO_2)N^-$, $(CF_3SO_2)(CF_3CO)N^-$, etc. Cyclic imide ions include $(CF_2SO_2)_2N^-$ (forming a five-membered ring), $CF_2(CF_2SO_2)_2N^-$ (forming a six-membered ring), etc. Among the imide ions, $(CF_3SO_2)_2N^-$ (abbreviated as TFSI) is most preferred.

A methide ion such as $(CF_3SO_2)_3C^-$ may also be used.

An alkylphosphate ion may also be used as the anion of the ionic liquid. For example, it includes $(CH_3O)_2PO_2^-$, $(C_2HSO)_2PO_2^-$, $(CH_3O)(C_2H_5O)PO_2^-$, etc. Here, one or more or all of H's of the alkyl group may be substituted with F's.

Other anions include inorganic ions, such as $CN^-$, $NO_3^-$, $ClO_4^-$, $SO_3^{2-}$, $SO_4^{2-}$, $S_2O_3^{2-}$, $SCN^-$, $CO_3^{2-}$, $PO_4^{3-}$, etc., and organic ions, such as $CH_3CO_2^-$, $C_2H_5CO_2^-$, $C_6H_5CO_2^-$ (benzoate ion), $^-OOC$—$COO^-$ (oxalate ion), $C_6H_4(CO_2)_2^{2-}$ (phthalate ion: ortho-, meta-, and para-), etc. One or more or all of H's of the organic ion may be substituted with F's. It may also be a sulfonate ion such as $CF_3SO_3^-$, $C_2F_5SO_3^-$, $C_3F_7SO_3^-$, and $C_4F_9SO_3^-$.

Some combinations between the cations and the anions described above will be a solid at room temperature. In such a case, the non-aqueous electrolyte may further include an organic solvent. However, as the amount of the organic solvent increases, the metal halide, which is the electrode active material, more easily dissolves in the non-aqueous electrolyte. Therefore, where the non-aqueous electrolyte includes an organic solvent, the amount of the organic solvent is generally equimolar or less to the ionic liquid.

Organic solvents include the following.

Cyclic carbonates include propylene carbonate (PC), ethylene carbonate (EC), butylene carbonate (BC), vinylene carbonate (VC), vinyl ethylene carbonate (VEC), fluoroethylene carbonate (FEC), etc.

Cyclic esters include γ-butyrolactone (GBL), α-methyl-γ-butyrolactone (MGBL), γ-valerolactone (GVL), furanone (FL), 3-methyl-2(5H)-furanone (MFL), α-angelica lactone (AGL), etc.

Chain carbonates include dimethyl carbonate (DMC), ethyl methyl carbonate (EMC), diethyl carbonate (DEC), methyl propyl carbonate (MPuC), methyl butyl carbonate (MBC), methyl pentyl carbonate (MPeC), etc.

Cyclic ethers include tetrahydrofuran (THF), 2-methyltetrahydrofuran (MTHF), 2,5-dimethyltetrahydrofuran (dMTHF), 1,3-dioxolan (DIOX), 2-methyl-1,3-dioxolan (MDIOX), tetrahydropyran (THP), 2-methyl-tetrahydropyran (MTHP), etc.

Chain ethers include diethyl ether (DEEt), methyl butyl ether (MBE), 1,2-dimethoxyethane (DME), 1-methoxy-2-ethoxyethane (EME), 1,2-diethoxyethane (DEE), etc. It may also be diglyme, triglyme, or tetraglyme, and polyethylene glycol of which both ends are aprotic is also preferred.

Nitriles include acetonitrile (AN), propionitrile (PN), adiponitrile (AGN), etc.

Organic solvents containing nitrogen or sulfur element include N-methylpyrrolidone (NMP), dimethyl sulfoxide (DMSO), etc.

Among the solvents described above, it is preferred to use a cyclic carbonate, a chain carbonate, a cyclic ether, or a chain ether.

These solvents may be used alone or some of them may be used in combination.

The electrolyte salt to be dissolved in the ionic liquid may be a salt made of an anion mentioned above for the ionic liquid and an alkali metal ion or an alkaline earth metal ion. Preferably, it is an alkali metal halide or an alkaline earth metal halide. Particularly, the electrolyte salt is preferably a lithium halide, such as LiF, LiCl, LiBr or LiI, because the halogen ion serves also as a charge transfer ion. For similar reasons, the electrolyte salt may be a magnesium halide, such as $MgF_2$, $MgCl_2$, $MgBr_2$ or $MgI_2$. These alkali metal halides and alkaline earth metal halides may be used alone or some of them may be used in combination. By using an alkali metal halide and an alkaline earth metal halide mixed with each other, it is possible to increase the solubility of the electrolyte salt in the ionic liquid. In order to increase the charging capacity per unit weight, a halogen whose atomic weight is small may be selected, e.g., $F^-$ or $Cl^-$, for the alkali metal halide and the alkaline earth metal halide.

Where the cation of the ionic liquid is diethyl-methyl-2-methoxy ethyl ammonium ion $((C_2H_5)_2(CH_3)(CH_3OCH_2CH_2)N^+$, abbreviated as DEME) and the anion is tetrafluoroborate ion ($BF_4^-$), LiF, LiCl, $MgF_2$ and $MgCl_2$, which are difficult to dissolve in an organic solvent, will have a significantly increased solubility. For example, the solubility of $MgCl_2$ in tetrahydrofuran (abbreviated as THF) is at most $MgCl_2$/THF=1/20 in molar ratio. In contrast, the solubility of $MgCl_2$ in $DEME.BF_4$ is at least $MgCl_2$/$DEME.BF_4$=5/20 in molar ratio.

(2) Positive Electrode and Negative Electrode

At least one of the positive electrode and the negative electrode contains a metal halide as an electrode active material.

The metal of the metal halide is an element selected from groups II to XV of the periodic table. Specifically, it is one or more selected from the group consisting of Mg, Ca, Sr, Ba, Sc, Y, La, Ce, Ti, Zr, V, Nb, Ta, Cr, Mo, W, Mn, Fe, Ru, Co, Ni, Cu, Ag, Au, Zn, Cd, Al, Ga, In, Sn, Pb, P, As, Sb, and Bi. The potential of a metal halide is determined by the particular metal element, the particular halogen, and the atomic ratio at which they combine with each other. Metals of these metal halides, except for halides of group II elements, are typically not easily soluble in the ionic liquid described above.

Preferred metal halides as positive electrode active materials include $AgF$, $AgCl$, $AlCl_3$, $BiF_3$, $BiCl_3$, $CoF_3$, $CoF_2$, $CoCl_2$, $CrF_3$, $CrCl_3$, $CrCl_2$, $CuF_2$, $CuF$, $CuCl_2$, $CuCl$, $FeF_3$, $FeF_2$, $FeCl_3$, $FeCl_2$, $GaF_3$, $GaCl_3$, $MnF_3$, $MnF_2$, $MnCl_2$, $MoCl_6$, $MoCl_5$, $MoCl_4$, $NbF_5$, $NbCl_5$, $NbCl_4$, $NiF_2$, $NiCl_2$, $PCl_5$, $RuF_5$, $RuCl_3$, $SnF_2$, $SnCl_2$, $TiF_4$, $TiCl_3$, $TiCl_2$, $VF_4$, $VF_3$, $VCl_3$, $VCl_2$, $WCl_6$, $WCl_5$, $WCl_4$, $WCl_2$, $ZnF_2$, $ZnCl_2$, $ZrCl_4$, $ZrCl_3$, and $ZrCl_2$. Where the metal halide is used as a positive electrode active material, the metal of the metal halide does not include group II elements. That is, the positive electrode active material does not include alkaline earth metal halides.

Preferred materials as negative electrode active materials include $AlF_3$, $BaF_2$, $BaCl_2$, $CaF_2$, $CaCl_2$, $CeF_3$, $CeCl_3$, $LaF_3$, $LaCl_3$, $MgF_2$, $MgCl_2$, $ScF_3$, $ScCl_3$, $SrF_2$, $SrCl_2$, $TiF_3$, and $YF_3$. Where a metal halide is used as a negative electrode active material, the metal of the metal halide includes group II elements. That is, the negative electrode active material includes alkaline earth metal halides.

Although metal halides have been classified above into positive electrode active materials and negative electrode active materials in view of the potential, any two of the same group can be a positive electrode active material and a negative electrode active material, depending on the metal halide combination, if there is a large potential difference therebetween.

Where a non-aqueous electrolyte secondary battery is produced as the electrochemical energy storage device by using a metal halide as a positive electrode active material, the negative electrode active material may be, in addition to the metal halides described above, an alkali metal such as lithium, an alkaline earth metal such as magnesium, an intercalation compound of lithium and graphite, which is employed for lithium-ion batteries, or an alloy or an oxide containing lithium. The alloy contains, for example, silicon, tin, lead, or bismuth as a component. The oxide contains, for example, silicon or tin as a component.

Where a hybrid capacitor is produced as the electrochemical energy storage device, the negative electrode material may be a carbon material, etc., capable of storing an electric double layer capacitance. The carbon material may include activated carbon, including a natural plant-based activated carbon such as palm shell, a synthetic resin-based activated carbon such as phenol, a fossil fuel-based activated carbon such as coke, etc. It may also be an ultra-fine powder activated carbon obtained by activating carbon black.

Where a non-aqueous electrolyte secondary battery is produced as the electrochemical energy storage device by using a metal halide as a negative electrode active material, an oxide such as $LiCoO_2$, $LiNiO_2$, $Li(Ni_{1/3}Mn_{1/3}CO_{1/3})O_2$, $LiMn_2O_4$, $Li(Li_xMn_{1-x})O_2$, $LiFePO_4$, etc., allowing for insertion/release of an alkali metal ion may be used, in addition to the metal halides described above, as a positive electrode active material. On the other hand, where a hybrid capacitor is to be assembled, a carbon material such as activated carbon can be used as described above.

The positive electrode and the negative electrode of the electrochemical energy storage device of the present embodiment may include a positive electrode mixture and a negative electrode mixture, which contain metal halides described above, and a current collector. For example, where a metal halide is used for the positive electrode active material, the positive electrode mixture may be produced by mixing together a metal halide described above, a conductive additive such as acetylene black, and a binder such as polyvinylidene fluoride. These powders may be mixed together as powders and then molded, or may be dispersed or dissolved in a solvent such as N-methyl-2-pyrrolidone (NMP) and then applied over the current collector. The current collector may be carbon, aluminum, molybdenum, tungsten, gold, platinum, etc.

Where a metal halide is used as a negative electrode active material, a negative electrode mixture may be produced by mixing together the powder of a metal halide described above, a conductive additive such as nickel, and a binder such as polyethylene oxide. These powders may be mixed together as powders and then molded, or may be dispersed or dissolved in a solvent such as acetonitrile and then applied over the current collector. Carbon, iron, nickel, copper, etc., may be used for the current collector. Alternatively, the negative electrode may be produced by filling pores of a conductive porous material such as nickel with the powder of the metal halide as it is.

(3) Separator

As long as the positive electrode and the negative electrode are electrically insulated from each other, and the non-aqueous electrolyte is kept in contact with the positive electrode and the negative electrode, the electrochemical energy storage device of the present embodiment can charge/discharge. In order to realize an electrochemical energy storage device with a stable form in practice, the electrochemical energy storage device may further include a separator typically used in a secondary battery, or the like. A separator is a resin layer formed by a resin with no electron conductivity, and is a microporous membrane that has a large ion permeability and has a predetermined degree of mechanical strength and electrical insulation. The separator is preferably produced by a material that is resistant against the non-aqueous electrolyte described above, and it is commonly used in a lithium secondary battery, for example. A polyolefin resin, obtained by using polypropylene, polyethylene, etc., alone or in combination, can be used.

(4) General Configuration of Electrochemical Energy Storage Device

Figure 14:
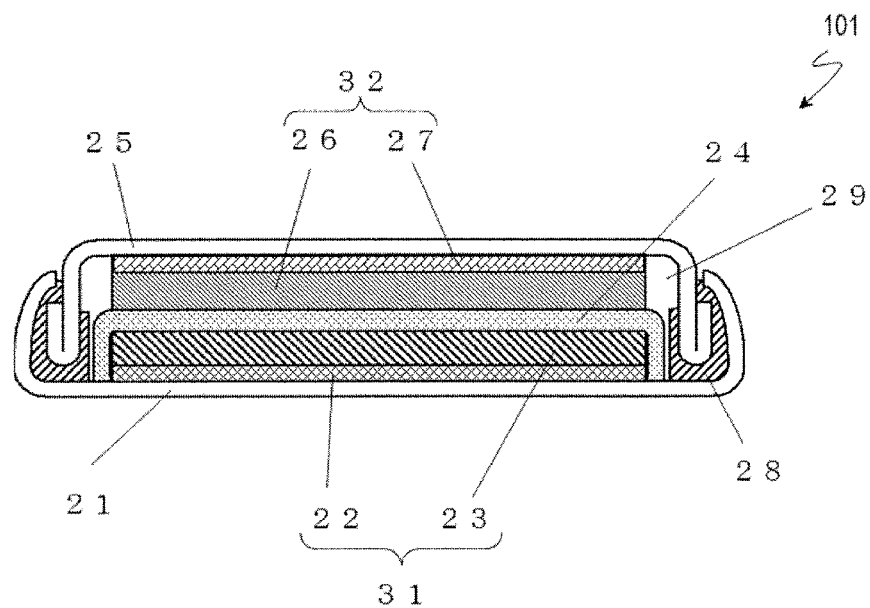
FIG. 14 A cross-sectional view showing one embodiment of a coin-type non-aqueous electrolyte secondary battery.

An example where a secondary battery is produced as the electrochemical energy storage device will be illustrated. FIG. 14 is a cross-sectional view showing an example of a coin-type secondary battery 101, which is an electrochemical energy storage device. The coin-type secondary battery 101 shown in FIG. 14 includes a positive electrode 31, a negative electrode 32, and a separator 24. The positive electrode 31 includes a positive electrode active material layer 23, and a positive electrode current collector 22 in contact with the positive electrode active material layer 23. The negative electrode 32 includes a negative electrode active material layer 26, and a negative electrode current collector 27 in contact with the negative electrode active material layer 26. At least one of the positive electrode active material layer and the negative electrode active material layer 26 contains a metal halide described above.

The positive electrode 31 and the negative electrode 32 oppose each other with the separator 24 sandwiched therebetween so that the positive electrode active material layer 23 and the negative electrode active material layer 26 are in contact with the separator 24, thereby forming a group of electrodes.

The group of electrodes is accommodated in the space inside a case 21. A non-aqueous electrolyte 29 described above is injected into the space inside the case 21 so that the positive electrode 31, the negative electrode 32 and the separator 24 are immersed in the non-aqueous electrolyte 29.

Since the separator 24 includes a minute space for holding the non-aqueous electrolyte 29, the non-aqueous electrolyte 29 is held in the minute space, thereby realizing a state where the non-aqueous electrolyte 29 is placed between the positive electrode 31 and the negative electrode 32. The opening of the case 21 is sealed by a sealing plate 25 using a gasket 28.

While FIG. 14 shows a coin-type secondary battery embodiment, the electrochemical energy storage device of the present embodiment may have any other shape. For example, it may have a cylindrical or rectangular shape. It may also have a large shape for use in an electric vehicle, or the like.

2. Electrode Reaction in Electrochemical Energy Storage Device

Next, the discharge reaction in a non-aqueous electrolyte secondary battery and a hybrid capacitor, which are examples of the electrochemical energy storage device of the present embodiment will be described. The charging reaction is a reaction that proceeds in the opposite direction (from the right-hand side to the left-hand side) from the discharge reaction to be described below. Although the charging reaction will not be illustrated in detail, it can be explained similarly.

(1) Non-Aqueous Electrolyte Secondary Battery (Positive Electrode Active Material: Metal Halide, Negative Electrode Active Material: Metal Halide)

The discharge reaction (the electrochemical reduction of the positive electrode active material) occurring at an electrode of a non-aqueous electrolyte secondary battery, or the like, can be expressed as shown in Equation 7, where $Me^{m+}$ represents the metal ion of the metal halide, which is the positive electrode active material, $A^+$ represents the alkali metal ion, and $X^-$ represents the halogen ion. The reaction formula can be formulated similarly also when the metal ion is an alkaline earth metal ion.

$$Me^{m+}X^-_m + mA^+ + me \rightarrow Me(0) + mA^+X^- \tag{7}$$

In Reaction Equation 7 above, the metal ion of the positive electrode active material $MeX_m$ is reduced to a metal of a valence of 0. However, it is sufficient if the oxidation number after reduction is less than +m. Moreover, $A^+X^-$, which is produced in the reduction reaction, may remain in the electrode or may partly dissolve in the electrolyte.

Similarly, the discharge reaction (the electrochemical oxidation of the negative electrode active material) can be expressed as shown in Equation 8, where $Me'^{m+}$ represents the metal ion of the negative electrode active material, and $X^-$ represents the halogen ion. The reaction formula can be formulated similarly also when the metal ion is an alkaline earth metal ion.

$$Me'(0) + nX^- \rightarrow Me'^{m+}X^-_n + ne \tag{8}$$

Adding opposite sides of Equation 7 and those of Equation 8 together yields Equation 9. Equation 9 represents the discharge reaction formula for the non-aqueous electrolyte secondary battery as a whole. As shown in Equation 9, it is as if the halogen ion of the positive electrode active material were moving to the negative electrode active material.

$$nMe^{m+}X^-_m + mMe'(0) \rightarrow nMe(0) + mMe'^{m+}X^-_n \tag{9}$$

Specific examples of the non-aqueous electrolyte secondary battery using this reaction will now be described.

In a non-aqueous electrolyte secondary battery of this reaction, $CuCl_2$ may be used as a positive electrode active material, and $MgCl_2$ may be used as a negative electrode active material, for example.

$$\text{(Positive electrode)} CuCl_2 + 2Li^+ + 2e \rightarrow Cu + 2LiCl \tag{7A}$$

$$\text{(Negative electrode)} Mg + 2LiCl \rightarrow MgCl_2 + 2Li^+ + 2e \tag{8A}$$

$$\text{(Overall)} CuCl_2 + Mg \rightarrow Cu + MgCl_2 \tag{9A}$$

(Battery power): 2.16 V

LiCl, produced in the positive electrode in this reaction, dissolves in the non-aqueous electrolyte. Since the dissolved $Cl^-$ ion is highly active, the charging reaction, which is a reaction of the opposite direction from Equation 9A above, can proceed smoothly. As can be seen from Equation 7A and Equation 8A, discharging produces LiCl at the positive electrode and consumes LiCl at the negative electrode. Therefore, there is no change in the apparent LiCl concentration in the non-aqueous electrolyte. This is similarly true also when charging. This makes it unlikely that the LiCl concentration in the non-aqueous electrolyte increases to thereby decrease the reaction rate when charging or discharging, and thus enables smooth charging/discharging. Since the $Cl^-$ ion is a conductor, it is unlikely that the dendrite of Mg is formed in the negative electrode even after repeating charging/discharging. Thus, it is possible to realize a non-aqueous electrolyte secondary battery having a high reliability.

It is also possible to realize a non-aqueous electrolyte secondary battery, which uses $CuCl_2$ as a positive electrode active material and $MgCl_2$ as a negative electrode active material, for example, and which utilizes the following reaction.

$$\text{(Positive electrode)} CuCl_2 + 2e \rightarrow Cu + 2Cl^- \tag{7B}$$

$$\text{(Negative electrode)} Mg + 2Cl^- \rightarrow MgCl_2 + 2e \tag{8B}$$

$$\text{(Overall)} CuCl_2 + Mg \rightarrow Cu + MgCl_2 \tag{9B}$$

(Battery power): 2.16 V

This non-aqueous electrolyte secondary battery uses the same positive electrode active material and the same negative electrode active material as those of the non-aqueous electrolyte secondary battery shown in Equations 7A to 9A, but is a shuttle-type battery that does not contain an $Li^+$ ion in the non-aqueous electrolyte and in which the $Cl^-$ ion moves between the positive electrode and the negative electrode as it is charged/discharged.

(2) Non-aqueous electrolyte secondary battery (positive electrode active material: metal halide, negative electrode active material: alkali metal or alkaline earth metal)

Where the negative electrode active material is not a metal halide but is an alkali metal, the discharge reaction (the electrochemical oxidation of the alkali metal) at the negative electrode can be expressed as shown in Equation 10. The reaction formula can be formulated similarly also when the negative electrode active material is an alkaline earth metal.

$$mA \rightarrow mA^+ + me \tag{10}$$

Adding opposite sides of Equation 7 and those of Equation 10 together yields Equation 11. Equation 11 is another discharge reaction formula for the non-aqueous electrolyte secondary battery of the present embodiment.

$$Me^{m+}X^-_m + mA \rightarrow Me(0) + mA^+X^- \tag{11}$$

It is possible to realize a non-aqueous electrolyte secondary battery, which uses AgCl as a positive electrode active material and Li as a negative electrode active material, for example, and which utilizes the following reaction.

(Positive electrode)$AgCl + Li^+ + e \rightarrow Ag + LiCl$ (7C)

(Negative electrode)$Li \rightarrow Li^+ + e$ (10C)

(Overall)$AgCl + Li \rightarrow Ag + LiCl$ (11C)

(Battery power): 2.85 V

Also with this non-aqueous electrolyte secondary battery, since LiCl, produced in the positive electrode, dissolves in the non-aqueous electrolyte, the charging reaction, which is a reaction of the opposite direction from Equation 11C above, can proceed smoothly.

It is also possible to realize a non-aqueous electrolyte secondary battery, which uses $CuCl_2$ as a positive electrode active material and Li the negative electrode active material, and which utilizes the following reaction.

(Positive electrode)$CuCl_2 + 2Li^+ + 2e \rightarrow Cu + 2LiCl$ (7D)

(Negative electrode)$2Li \rightarrow 2Li^+ + 2e$ (10D)

(Overall)$CuCl_2 + 2Li \rightarrow Cu + 2LiCl$ (11D)

In this case, Li dissolves/deposits at the negative electrode when charging/discharging.

It is also possible to realize a non-aqueous electrolyte secondary battery, which uses $CuCl_2$ as a positive electrode active material and Mg the negative electrode active material, and which utilizes the following reaction.

(Positive electrode)$CuCl_2 + Mg^{2+} + 2e \rightarrow Cu + MgCl_2$ (7E)

(Negative electrode)$Mg \rightarrow Mg^{2+} + 2e$ (10D)

(Overall)$CuCl_2 + Mg \rightarrow Cu + MgCl_2$ (11E)

In this case, Mg dissolves/deposits at the negative electrode when charging/discharging.

(3) Non-aqueous electrolyte secondary battery (positive electrode active material: alkali metal oxide, negative electrode active material: metal halide)

Where an alkali metal complex oxide, such as $LiCoO_2$, which allows for insertion/release of an alkali metal ion, is used as a positive electrode active material, alkali metals can be present in the alkali metal complex oxide at various ratios. It is possible to realize a non-aqueous electrolyte secondary battery, which uses $Li_{0.5}CoO_2$ as a positive electrode active material and $MgCl_2$ as a negative electrode active material, and which utilizes the following reaction.

(Positive electrode)$4Li_{0.5}CoO_2 + 2Li^+ + 2e \rightarrow 4LiCoO_2$ (7F)

(Negative electrode)$Mg + 2LiCl \rightarrow MgCl_2 + 2Li^+ + 2e$ (8F)

(Overall)$4Li_{0.5}CoO_2 + Mg + 2LiCl \rightarrow 4LiCoO_2 + MgCl_2$ (11F)

In this case, at the negative electrode, $Cl^-$ moves in and out of Mg when charging/discharging.

(4) Hybrid Capacitor (Positive Electrode Active Material: Metal Halide)

Where a metal halide is used as a positive electrode active material of a hybrid capacitor, the discharge reaction (the electrochemical reduction of positive electrode active material) can be expressed as shown in Equation 7'.

$Me^{m+}X^-_m + mA^+ + me \rightarrow Me(0) + mA^+X^-$ (7')

Where a material capable of storing an electric double layer capacitance is used for the negative electrode of a hybrid capacitor, the discharge reaction at the negative electrode is expressed as shown in Equation 12. $D^-$ represents the negatively-charged negative electrode material, $Q^+$ represents the cation adsorbing on the negative electrode material, and $-m$ represents the net charge stored in the negative electrode.

$m[D^-][Q^+] \rightarrow mD + mQ^+ + me$ (12)

Adding opposite sides of Equation 7' and those of Equation 12 together yields Equation 13. Equation 13 represents the discharge reaction formula for the hybrid capacitor as a whole. As shown in Equation 13, it is as if the halogen ion of the positive electrode active material were bound to the alkali metal ion in the non-aqueous electrolyte.

$Me^{m+}X^-_m + mA^+ + m[D^-][Q^+] \rightarrow Me(0) + mA^+X^- + mD + mQ^+$ (13)

In a hybrid capacitor of this reaction, $CuCl_2$ may be used as a positive electrode active material, and a material having an electric double layer capacitance can be used for the negative electrode, for example.

(Positive electrode)$CuCl_2 + Li^+ + e \rightarrow CuCl + LiCl$ (7G)

(Negative electrode)$(1/\delta)C^{\delta-}(Li^+)_\delta \rightarrow (1/\delta)C + Li^+ + e$ (12G)

(Overall)$CuCl_2 + (1/\delta)C^{\delta-}(Li^+)_\delta \rightarrow CuCl + LiCl + (1/\delta)C$ (13G)

Also with this hybrid capacitor, since LiCl, produced in the positive electrode, dissolves in the non-aqueous electrolyte, the charging reaction, which is a reaction of the opposite direction from Equation 13G above, can proceed smoothly.

(5) Hybrid Capacitor (Negative Electrode Active Material: Metal Halide)

Where a metal halide is used as a negative electrode active material of the hybrid capacitor, the discharge reaction (the electrochemical oxidation of the negative electrode active material) can be expressed as shown in Equation 14.

$Me'(0) + mX^- \rightarrow Me'^{m+}X^-_m + me$ (14)

Where a material capable of storing an electric double layer capacitance is used for the positive electrode of a hybrid capacitor, the discharge reaction at the positive electrode is expressed as shown in Equation 15. $D^+$ represents the positively-charged positive electrode material, $P^-$ represents the anion adsorbing on the positive electrode material, and $+m$ represents the net charge stored in the positive electrode.

$m[D^+][P^-] + me \rightarrow mD + mP$ (15)

Adding opposite sides of Equation 14 and those of Equation 15 together yields Equation 16. Equation 16 represents another discharge reaction formula for the hybrid capacitor as a whole. As shown in Equation 16, it is as if the halogen ion in the non-aqueous electrolyte were bound to the negative electrode active material.

$m[D^+][P^-] + Me'(0) + mX^- \rightarrow mD + mP^- + Me'^{m+}X^-_m$ (16)

In a hybrid capacitor of this reaction, a material having an electric double layer capacitance can be used for the positive electrode, and $MgCl_2$ can be used as a negative electrode active material, for example.

(Positive electrode)$(2/\delta)C^{\delta+}(Cl^-)_\delta + 2e \rightarrow (2/\delta)C + 2Cl^-$ (14G)

(Negative electrode)$Mg + 2Cl^- \rightarrow MgCl_2 + 2e$ (15G)

(Overall)$(2/\delta)C^{\delta+}(Cl^-)_\delta + Mg \rightarrow (2/\delta)C + MgCl_2$ (16H)

Also with this hybrid capacitor, since $MgCl_2$, produced in the negative electrode, dissolves in the non-aqueous electrolyte, the charging reaction, which is a reaction of the opposite direction from Equation 16H above, can proceed smoothly.

Thus, in the electrochemical energy storage device of the present embodiment, the ionic liquid, capable of dissolving alkali metal halides and alkaline earth metal halides, receives/releases a halogen ion during the reduction of a metal halide, which is the active material, to a metal, and during the re-oxidation of the metal. With copper chloride ($CuCl_2$) as a positive electrode active material, copper metal (Cu) as its reduced form, and lithium chloride (LiCl) as an alkali metal halide (Equation 3 above), for example, lithium chloride, produced during discharging is taken in by the ionic liquid to be turned into lithium ion ($Li^+$) and chlorine ion ($Cl^-$). During charging, the chlorine ion is released from the ionic liquid, and the copper metal turns back into copper chloride. The chlorine ion is present in the form of clusters, together with the cation and the anion of the ionic liquid. Therefore, even though it is electrochemically reactive, it has a reduced chemical reactivity such as to form a complex ion with a metal halide, thus suppressing the dissolution of copper chloride in the electrolyte.

An ionic liquid made of a cation having an alkoxyalkyl group and a tetrafluoroborate ion ($BF_4^-$) is capable of dissolving large amounts of alkali metal halides and alkaline earth metal halides. This decreases the overpotential during the electrochemical reaction in which the halogen ion moves in and out of the electrode active material. For example, with lithium chloride dissolved, the leftward reaction in Equation 4 and Equation 3 proceeds desirably during the electrochemical oxidation reaction between metal copper and chlorine ion ($Cl^-$) (corresponding to charging for batteries), so that it occurs more preferentially than the electrochemical oxidation reaction with tetrafluoroborate ion ($BF_4^-$). Lithium chloride, produced in the electrochemical reduction reaction of copper chloride ($CuCl_2$) (corresponding to discharging for batteries), combines with lithium chloride, which has already been dissolved in the ionic liquid, to further decrease the chemical reactivity, thereby suppressing the formation of complex ion between copper chloride and chlorine ion.

Thus, according to the present embodiment, where the non-aqueous electrolyte described above is used, even if a metal halide is used as an electrode active material, the halogen ion can repeatedly move in and out of the metal halide because of the low solubility of the metal halide in the non-aqueous electrolyte solution. Therefore, by using a metal halide as an electrode active material, in combination with the non-aqueous electrolyte described above, it is possible to realize a non-aqueous electrolyte secondary battery and a hybrid capacitor having a high energy density.

Note that although the electrochemical energy storage device has been described above in the present embodiment with respect to a secondary battery as an example, the electrochemical energy storage device may be a primary battery. Conventionally, primary batteries using a metal halide, particularly those using a highly-soluble metal chloride, have been used, where the electrode active material and the electrolyte are brought into contact with each other immediately before use, as seen with liquid-injection type batteries. According to the present embodiment, even in a state where a primary battery is completed, where a metal halide as an electrode active material is in contact with the ionic liquid, a metal halide does not easily dissolve in the ionic liquid, thereby suppressing deterioration of properties of the primary battery.

EXAMPLES

The embodiment of the present invention will now be described in greater detail by way of examples. Note that experiments were conducted all at room temperature and in a glove box of an argon atmosphere.

Example 1

It was confirmed that an ionic liquid of which a component is a cation having an alkoxyalkyl group could dissolve lithium chloride (LiCl), and that there was an electrochemical reactivity of chlorine ion ($Cl^-$).

Diethyl-methyl-2-methoxy ethyl ammonium ion (($C_2H_5)_2(CH_3)(CH_3OCH_2CH_2)N^+$, abbreviated as DEME) was selected as a quaternary ammonium ion having an alkoxyalkyl group and tetrafluoroborate ion ($BF_4^-$) as an anion, and an ionic liquid prepared therefrom (abbreviated as $DEME.BF_4$) was used as a solvent of a non-aqueous electrolyte.

When lithium chloride (LiCl from Aldrich) and $DEME.BF_4$ (from Kanto Kagaku) were mixed together at a molar ratio of $LiCl/DEME.BF_4=1/10$ and stirred for 24 hours, LiCl dissolved completely, producing a clear liquid.

A silver wire having a diameter of 1 mm (from Nilaco Corporation) was used as the working electrode, and two strips of lithium foil (from Honjo Metal Co., Ltd.) attached to a nickel net current collector were prepared and used as the reference electrode and the counter electrode.

The three electrodes were immersed in the solution of $LiCl/DEME.BF_4=1/10$ for cyclic voltammetry. The measurement conditions included a sweep rate of 1 mV/sec, a sweep range from 1.8 to 3.8 V, and eight cycles.

FIG. 1 shows the waveform during the eighth cycle. In FIG. 1, an oxidation wave and a reduction wave are observed, each having generally an equal quantity of electricity, on opposite sides of 2.8 V. The fact that the silver wire was purplish brown when the oxidation wave had finished flowing, and it was white when the reduction wave had finished flowing indicates that the reaction of Equation 17 below was occurring. Note that the potential indicated preceding Equation 17 is a value calculated based on the standard free energies of formation LiCl and AgCl.

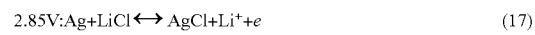

$$2.85V: Ag+LiCl \longleftrightarrow AgCl+Li^++e \quad (17)$$

From this result, it can be seen that the non-aqueous electrolyte used in the present embodiment has an electrochemical reactivity of chlorine ion ($Cl^-$).

Example 2

It was confirmed that it is possible to allow chlorine ion to move in and out of metal copper (Cu) in a solution containing chlorine ion ($Cl^-$) having an electrochemical reactivity.

A solution of $LiCl/DEME.BF_4=1/10$ was prepared as described in Example 1.

A copper wire having a diameter of 1 mm (from Nilaco Corporation) was used as the working electrode, and two strips of lithium foil attached to a nickel net current collector were prepared and used as the reference electrode and the counter electrode.

The three electrodes were immersed in the solution of $LiCl/DEME.BF_4=1/10$ for cyclic voltammetry. The measurement conditions included a sweep rate of 1 mV/sec, a sweep range from 1.7 to 3.6 V, and eight cycles.

Figure 2:
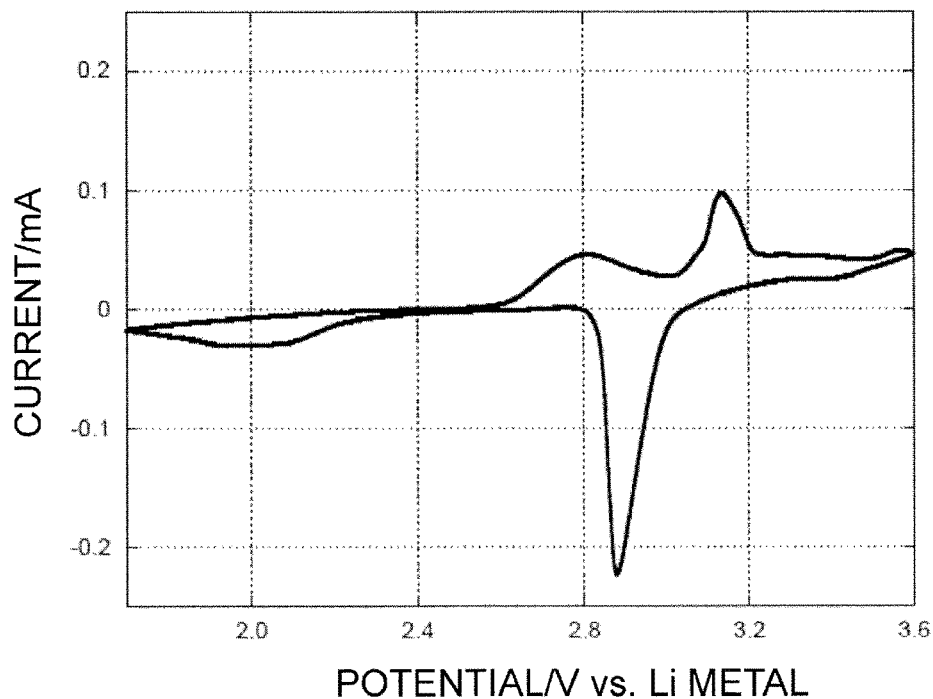
FIG. 2 A graph representing a potential-current change observed in a cyclic voltammetry with a copper wire in an LiCl/DEME.BF$_4$ solution.

FIG. 2 shows the waveform during the eighth cycle. In FIG. 2, some pairs of an oxidation wave and a reduction wave are observed on opposite sides of 2.5 V and 3.0 V, respectively. A small peak is also observed indicating that an oxidation reaction occurred from near 3.4 V. These three waves correspond to Equations 2' to 4' below, indicating that metal copper (Cu) causes an electrochemical reaction with chlorine ion (Cl$^-$) in the non-aqueous electrolyte. The waveform is relatively sharp, and it can be seen that copper chloride (CuCl$_2$ and CuCl), produced in the electrochemical oxidation, does not easily dissolves in the non-aqueous electrolyte used in the present embodiment.

3.40V:CuCl$_2$+Li$^+$+$e$ ⟷ CuCl+LiCl (2')

3.07V:CuCl$_2$+2Li$^+$+2$e$ ⟷ Cu+2LiCl (3')

2.74V:CuCl+Li$^+$+$e$ ⟷ Cu+LiCl (4')

Example 3

It was confirmed that it is possible to allow chlorine ion to move in and out of metal bismuth (Bi) in a solution containing chlorine ion (Cl$^-$) having an electrochemical reactivity.

A solution of LiCl/DEME.BF$_4$=1/10 was prepared as described in Example 1.

A metal bismuth wire having a diameter of 1.5 mm (from Alfa Aesar) was used as the working electrode, and two strips of lithium foil attached to a nickel net current collector were prepared and used as the reference electrode and the counter electrode.

The three electrodes were immersed in the solution of LiCl/DEME.BF$_4$=1/10 for cyclic voltammetry. The measurement conditions included a sweep rate of 1 mV/sec, a sweep range from 1.7 to 3.6 V, and eight cycles.

Figure 3:
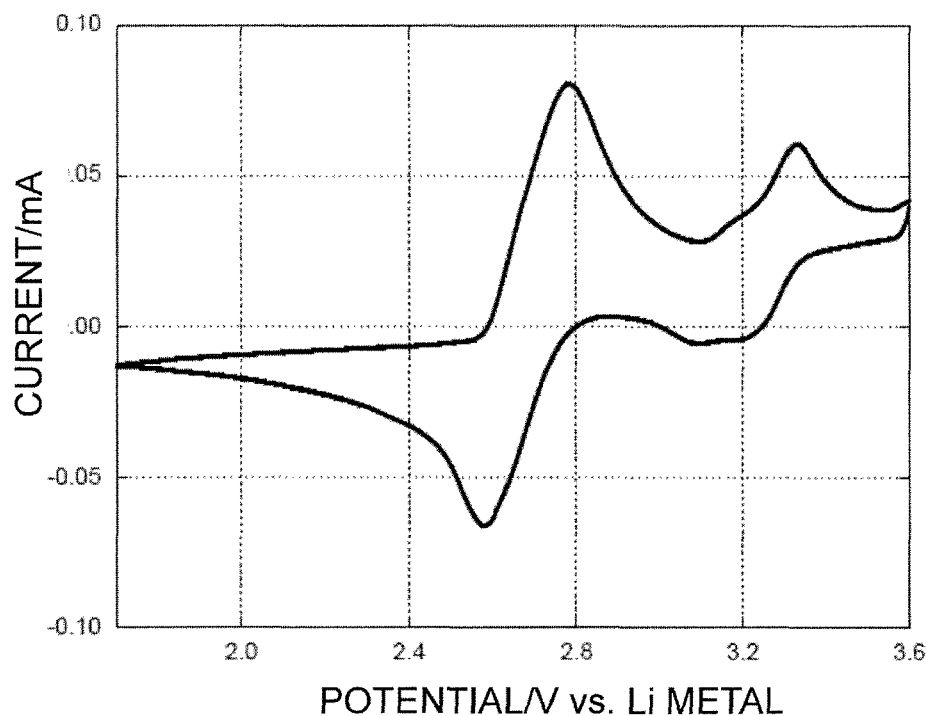
FIG. 3 A graph representing a potential-current change observed in a cyclic voltammetry with a metal bismuth wire in an LiCl/DEME.BF$_4$ solution.

FIG. 3 shows the waveform during the eighth cycle. In FIG. 3, pairs of an oxidation wave and a reduction wave are observed near 2.7 V and 3.3 V, respectively.

Bismuth chloride (BiCl$_3$ from Aldrich), acetylene black (abbreviated as AB), and polytetrafluoroethylene powder (abbreviated as PTFE) were kneaded at a weight ratio of BiCl$_3$/AB/PTFE=50/40/10, and the product was pressed and stuck onto a platinum net current collector, thus producing a working electrode. This working electrode, together with a lithium foil reference electrode and a lithium foil counter electrode, was immersed in the solution of LiCl/DEME.BF$_4$=1/10 for cyclic voltammetry. The sweep rate was 0.1 mV/sec.

Figure 4:
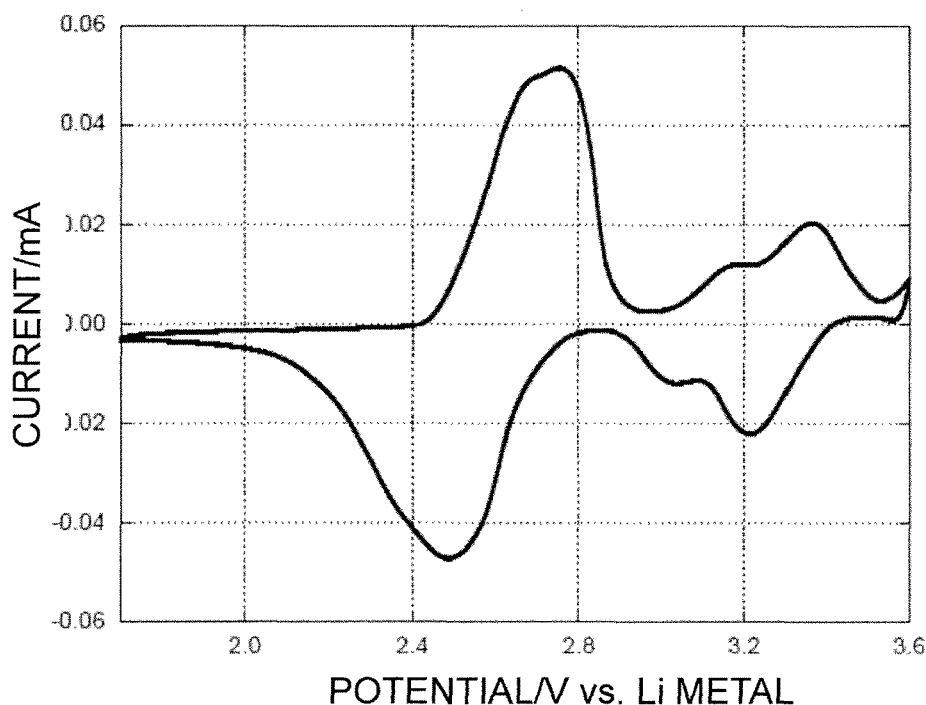
FIG. 4 A graph representing a potential-current change observed in a cyclic voltammetry with a bismuth chloride (BiCl$_3$) electrode in an LiCl/DEME.BF$_4$ solution.

FIG. 4 shows the waveform during the second cycle. In FIG. 4, pairs of an oxidation wave and a reduction wave are observed near 2.7 V and 3.3 V, respectively. A comparison between FIG. 3 and FIG. 4 indicates that cyclic voltammetry waveforms are very similar to each other whether starting from metal bismuth (Bi) or starting from bismuth chloride (BiCl$_3$), thus indicating that metal bismuth (Bi) allows chlorine ion (Cl$^-$) to reversibly move in and out of it. Although the electrochemical reaction between metal bismuth (Bi) and chlorine ion (Cl$^-$) is not known, it is believed that based on the waveform area ratio, the following two stages of reactions are occurring.

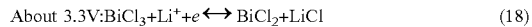
About 3.3V:BiCl$_3$+Li$^+$+$e$ ⟷ BiCl$_2$+LiCl (18)

About 2.7 V:BiCl$_2$+2Li$^+$+2$e$ ⟷ Bi+2LiCl (19)

Example 4

It was confirmed that it was possible to prepare a solution containing chlorine ion (Cl$^-$) having an electrochemical reactivity also by dissolving magnesium chloride (MgCl$_2$) in an ionic liquid.

When magnesium chloride (MgCl$_2$ from Aldrich) and DEME.BF$_4$ (from Kanto Kagaku) were mixed together at a molar ratio of MgCl$_2$/DEME.BF$_4$=1/4 and stirred for 72 hours, MgCl$_2$ dissolved completely, producing a viscous liquid.

A copper wire having a diameter of 1 mm (from Nilaco Corporation) was used as the working electrode, and a lithium foil (from Honjo Metal Co., Ltd.) attached to a nickel net current collector was used as the reference electrode. A carbon felt (from Tsukuba Materials Information Laboratory, Ltd.) was used as the counter electrode.

The three electrodes were immersed in the solution of MgCl$_2$/DEME.BF$_4$=1/4 for cyclic voltammetry. The measurement conditions included a sweep rate of 1 mV/sec, a sweep range from 1.5 to 3.8 V, and eight cycles.

Figure 5:
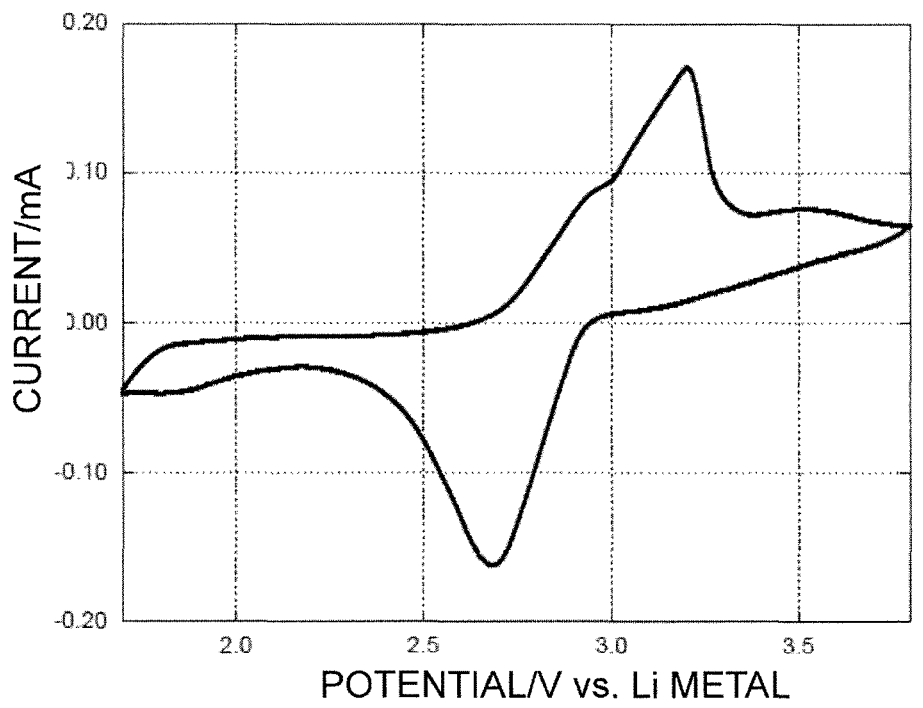
FIG. 5 A graph representing a potential-current change observed in a cyclic voltammetry with a copper wire in an MgCl$_2$/DEME.BF$_4$ solution.

FIG. 5 shows the waveform during the eighth cycle. Although the peak separation is not clear in FIG. 5 because of the high viscosity of the solution, it is quite similar to FIG. 2 of Example 2, indicating that there exists electrochemically reactive chlorine ion (Cl$^-$) in the DEME.BF$_4$ solution in which magnesium chloride (MgCl$_2$) is dissolved.

Reference Example 1

Using propylene carbonate which does not substantially dissolve lithium chloride (LiCl), it was confirmed that it is difficult to allow chlorine ion (Cl$^-$) to move in and out of a metal chloride.

Lithium tetrafluoroborate (LiBF$_4$) was dissolved in propylene carbonate (abbreviated as PC) at a molar ratio of LiBF$_4$/PC=1/4.

As in Example 3, bismuth chloride (BiCl$_3$), acetylene black (abbreviated as AB) and polytetrafluoroethylene powder (abbreviated as PTFE) were kneaded at a weight ratio of BiCl$_3$/AB/PTFE=50/40/10, and the product was pressed and stuck onto a platinum net current collector, thus producing the working electrode. Moreover, two strips of lithium foil (from Honjo Metal Co., Ltd.) attached to a nickel net current collector were prepared and used as the reference electrode and the counter electrode.

The three electrodes were immersed in the solution of LiBF$_4$/PC=1/4 for cyclic voltammetry. The measurement conditions included a sweep rate of 1 mV/sec, a sweep range from 1.7 to 3.6 V, and eight cycles.

Figure 6:
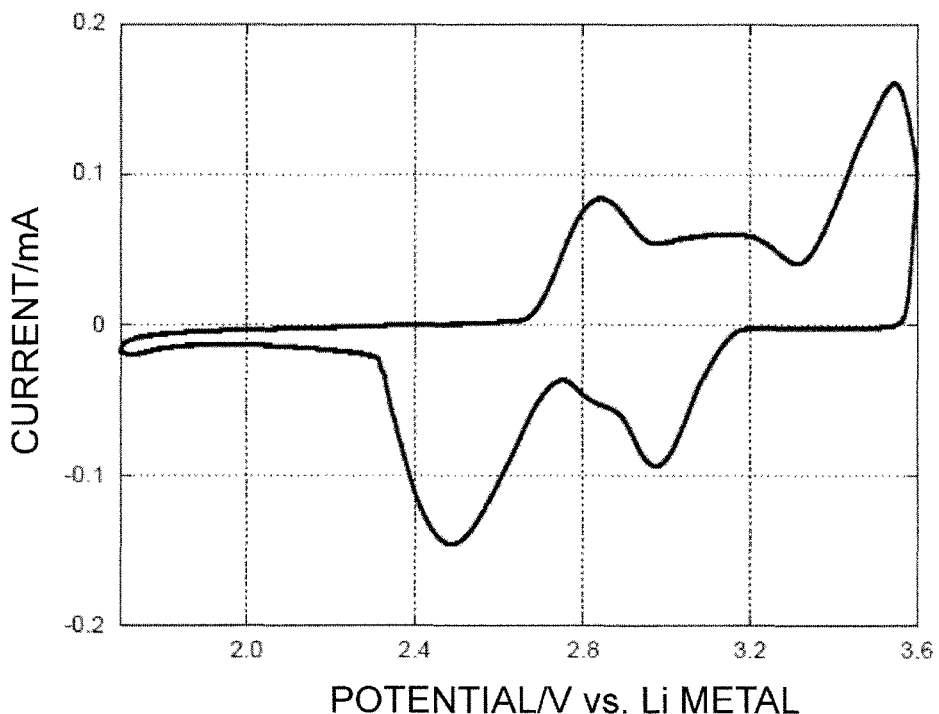
FIG. 6 A graph representing potential-current change for the first cycle observed in a cyclic voltammetry with a bismuth chloride (BiCl$_3$) electrode in an LiBF$_4$/PC solution.
Figure 7:
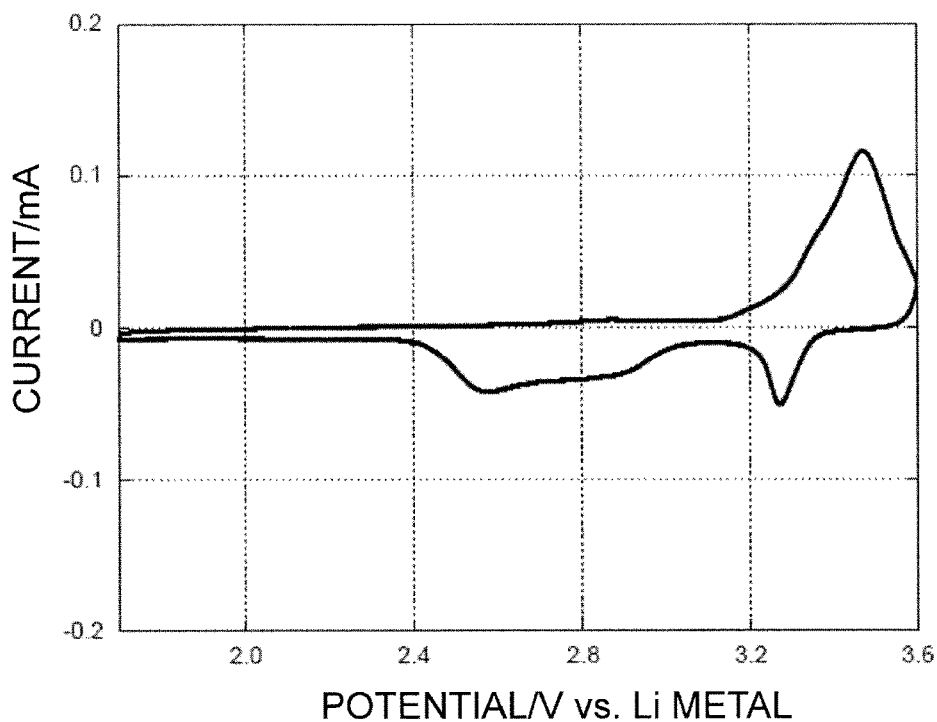
FIG. 7 A graph representing a potential-current change for the eighth cycle observed in a cyclic voltammetry with a bismuth chloride (BiCl$_3$) electrode in an LiBF$_4$/PC solution.

FIG. 6 shows the waveform during the first cycle of cyclic voltammetry. FIG. 7 shows the waveform during the eighth cycle.

A comparison between FIG. 4 of Example 3 and FIGS. 6 and 7 of this example indicates that as the cycle repeats, the oxidation/reduction waves at 3.3 V and 2.7 V where chlorine ion (Cl$^-$) moves in and out of bismuth chloride (BiCl$_3$) disappear, and an oxidation wave having a peak near 3.5 V appears instead. This peak has been known to be the following reaction through another experiment in which a metal bismuth wire was used as the working electrode.

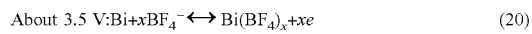
About 3.5 V:Bi+$x$BF$_4^-$ ⟷ Bi(BF$_4$)$_x$+$x$$e$ (20)

Moreover, after the cyclic voltammetry in the solution of LiBF$_4$/PC=1/4, the reference electrode became slightly blackish and metal bismuth was detected therefrom, indicating that bismuth chloride (BiCl$_3$), the active material, had dissolved.

From these facts, it is believed that even though metal bismuth (Bi) and lithium chloride (LiCl) are produced during the electrochemical reduction (corresponding to discharging for batteries), there is only a small amount of electrochemically reactive chlorine ion (Cl$^-$) because LiCl does not easily dissolve in the solution used in Reference Example 1. Therefore, it is believed that as charging/discharging is repeated, chlorine ion (Cl$^-$) can no longer move in and out of metal bismuth (Bi).

Example 5

It was confirmed that with the non-aqueous electrolyte solution of the present embodiment, even if there is no lithium chloride (LiCl) dissolved therein, it dissolves LiCl produced during the electrochemical reduction of the active material, thereby producing chlorine ion (Cl$^-$) having a high electrochemical reactivity.

Lithium tetrafluoroborate (LiBF$_4$ from Kishida Chemical Co., Ltd.) was dissolved in DEME.BF$_4$ at a molar ratio of LiBF$_4$/DEME.BF$_4$=1/10.

As in Example 3, bismuth chloride (BiCl$_3$), acetylene black (abbreviated as AB) and polytetrafluoroethylene powder (abbreviated as PTFE) were kneaded at a weight ratio of BiCl$_3$/AB/PTFE=50/40/10, and the product was pressed and stuck onto a platinum net current collector, thus producing the working electrode. Moreover, two strips of lithium foil (from Honjo Metal Co., Ltd.) attached to a nickel net current collector were prepared and used as the reference electrode and the counter electrode.

The three electrodes were immersed in the solution of LiBF$_4$/DEME.BF$_4$=1/10 for cyclic voltammetry. The measurement conditions included a sweep rate of 1 mV/sec, a sweep range from 1.7 to 3.6 V, and eight cycles.

Figure 8:
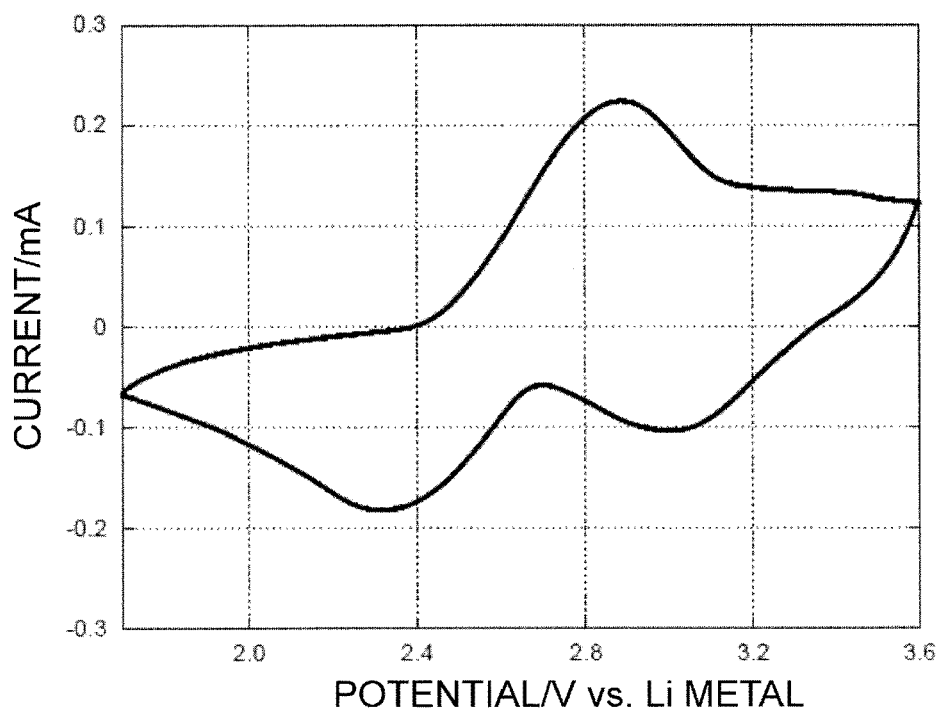
FIG. 8 A graph representing a potential-current change observed in a cyclic voltammetry with a bismuth chloride (BiCl$_3$) electrode in an LiBF$_4$/DEME.BF$_4$ solution.

FIG. 8 shows the waveform during the eighth cycle. Although the peak separation is not clear because of the high sweep rate, it can be seen that an electrochemical reaction similar to FIG. 4 of Example 3 is occurring. That is, it can be seen that chlorine ion (Cl$^-$) reversibly moves in and out of bismuth chloride (BiCl$_3$).

Example 6

It was confirmed that it is possible to allow chlorine ion (Cl$^-$) to move in and out of metal magnesium (Mg) by repeating electrochemical reduction and oxidation using magnesium chloride (MgCl$_2$) as a negative electrode active material.

Bis(trifluoromethanesulfonyl)imide lithium ((CF$_3$SO$_2$)$_2$NLi from Kishida Chemical Co., Ltd., abbreviated as LiTFSI) and diethyl methyl-2-methoxy ethyl ammonium.bis(trifluoromethanesulfonyl)imide ((C$_2$H$_5$)$_2$(CH$_3$)(CH$_3$OCH$_2$CH$_2$)N.(CF$_3$SO$_2$)$_2$N from Kanto Kagaku, abbreviated as DEME.TFSI) were mixed at a molar ratio of LiTFSI/DEME.TFSI=1/10, and LiTFSI was dissolved.

Magnesium chloride (MgCl$_2$ from Aldrich) was ground in a mortar, and a porous material of metal nickel (from Nilaco Corporation) was filled with the ground magnesium chloride, thus producing the working electrode. Moreover, two strips of lithium foil (from Honjo Metal Co., Ltd.) attached to a nickel net current collector were prepared and used as the reference electrode and the counter electrode.

The three electrodes were immersed in the solution of LiTFSI/DEME.TFSI=1/10 for cyclic voltammetry. The measurement conditions included a sweep rate of 1 mV/sec, a sweep range from 0.0 to 2.0 V, and fifty cycles.

Figure 9:
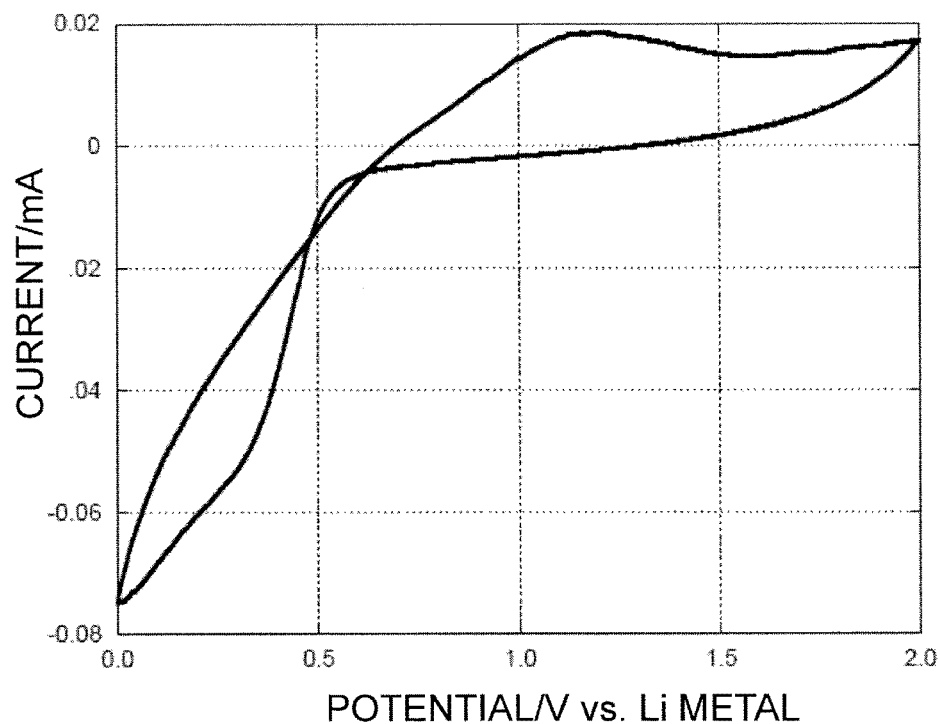
FIG. 9 A graph representing a potential-current change observed in a cyclic voltammetry with a magnesium chloride (MgCl$_2$) electrode in an LiTFSI/DEME.TFSI solution.

FIG. 9 shows the waveform during the fiftieth cycle. Although an oxidation current due to the nickel metal porous material is overlapping near 0.8 V, an oxidation wave and a reduction wave appear at potentials close to the reaction of Equation 21. Observing the electrode after cyclic voltammetry, it was found that chlorine had come out of magnesium chloride particles to leave a sponge-like material with some portions where metal magnesium was the primary component. From these facts, it is believed that chlorine ion (Cl$^-$) reversibly moves in and out of metal magnesium.

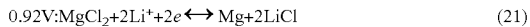

$$0.92V: MgCl_2 + 2Li^+ + 2e \leftrightarrow Mg + 2LiCl \quad (21)$$

Note that DEME.TFSI was used as the ionic liquid in this example because of the lower solubility for magnesium chloride (MgCl$_2$) than DEME.BF$_4$, which makes it possible to stably keep the shape of the electrode in which MgCl$_2$ was used as a negative electrode active material.

Example 7

It was confirmed that an ionic liquid of which a component is a cation having an alkoxyalkyl group was capable of dissolving lithium fluoride (LiF), albeit slightly, and had an electrochemical reactivity of fluorine ion (F—).

Diethyl-methyl-2-methoxy ethyl ammonium ion ((C$_2$H$_5$)$_2$(CH$_3$)(CH$_3$OCH$_2$CH$_2$)N$^+$, abbreviated as DEME) was selected as a quaternary ammonium ion having an alkoxyalkyl group and tetrafluoroborate ion (BF$_4^-$) as an anion, and an ionic liquid prepared therefrom (abbreviated as DEME.BF$_4$) was used as a solvent of a non-aqueous electrolyte.

Lithium fluoride (LiF from Aldrich) and DEME.BF$_4$ (from Kanto Kagaku) were mixed together at a molar ratio of LiF/DEME.BF$_4$=0.1/10 and stirred for 48 hours, thus preparing a solution saturated with lithium fluoride (LiF).

A copper wire having a diameter of 1 mm (from Nilaco Corporation) was used as the working electrode, and two strips of lithium foil (from Honjo Metal Co., Ltd.) attached to a nickel net current collector were prepared and used as the reference electrode and the counter electrode.

The three electrodes were immersed in the solution of DEME.BF$_4$=1/10 saturated with LiF for cyclic voltammetry. The measurement conditions included a sweep rate of 0.5 mV/sec, a sweep range from 1.0 to 4.2 V, and four cycles.

Figure 10:
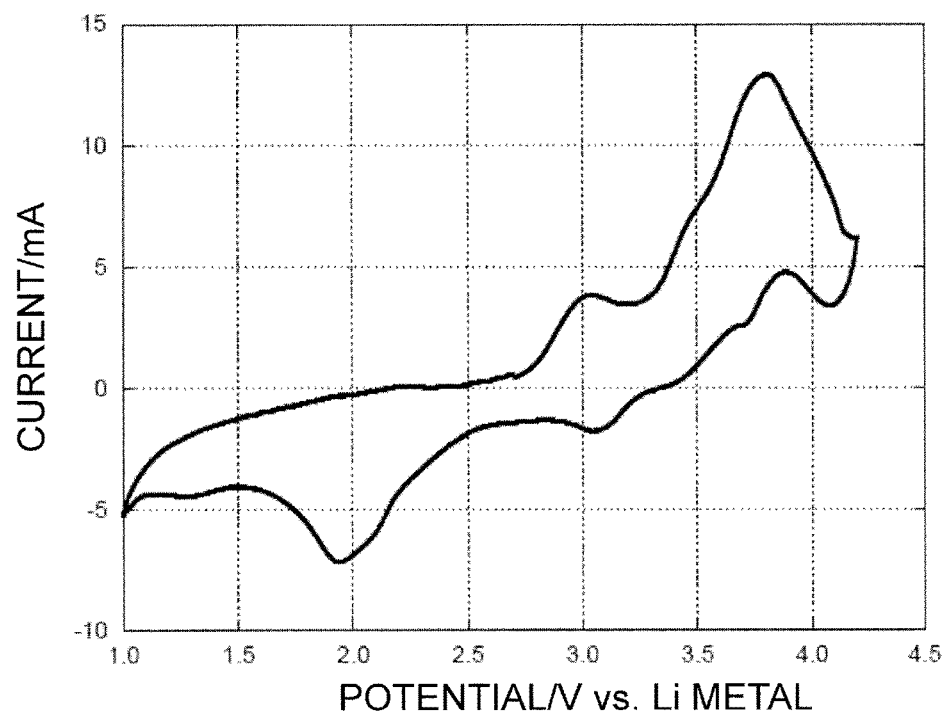
FIG. 10 A graph representing a potential-current change observed in a cyclic voltammetry with a copper wire in a DEME.BF$_4$ solution saturated with LiF.

FIG. 10 shows the waveform during the fourth cycle. In FIG. 10, an oxidation current having a peak near 3.7 V is observed. In order to examine that this oxidation wave is copper fluoride (CuF$_2$) being produced by a reaction between metal copper and fluorine ion (F$^-$) present in the solution, DEME.BF$_4$ remaining thereon was rinsed with dimethyl sulfoxide (from Kishida Chemical Co., Ltd.), and analysis was performed by x-ray photoelectron spectroscopy. As a result, no signal attributable to B1s was detected, but a signal attributable to F1s was observed near 686 eV as described in Non-Patent Document 1, which allows us to determine that the reaction of Equation 1' was occurring.

$$3.54V: CuF_2 + 2Li^+ + 2e \leftrightarrow Cu + 2LiF \quad (1')$$

Example 8

It was confirmed that by using cuprous chloride (CuCl) as a positive electrode active material, it is possible to allow chlorine ion (Cl$^-$) to move in and out of it.

Cuprous chloride (from Aldrich), acetylene black (abbreviated as AB) and polytetrafluoroethylene powder (abbreviated as PTFE) were kneaded at a weight ratio of CuCl/AB/PTFE=50/40/10, and the product was pressed and stuck onto a platinum net current collector, thus producing the working electrode. Moreover, two strips of lithium foil (from Honjo Metal Co., Ltd.) attached to a nickel net current collector were prepared and used as the reference electrode and the counter electrode.

A solution of $LiCl/DEME.BF_4=1/10$ was prepared as described in Example 1.

The three electrodes were immersed in the solution of $LiCl/DEME.BF_4=1/10$, and charging/discharging was performed while conducting a constant current of 10 µA so that the potential of the working electrode was in the range from 1.7 to 3.6 V.

Figure 11:
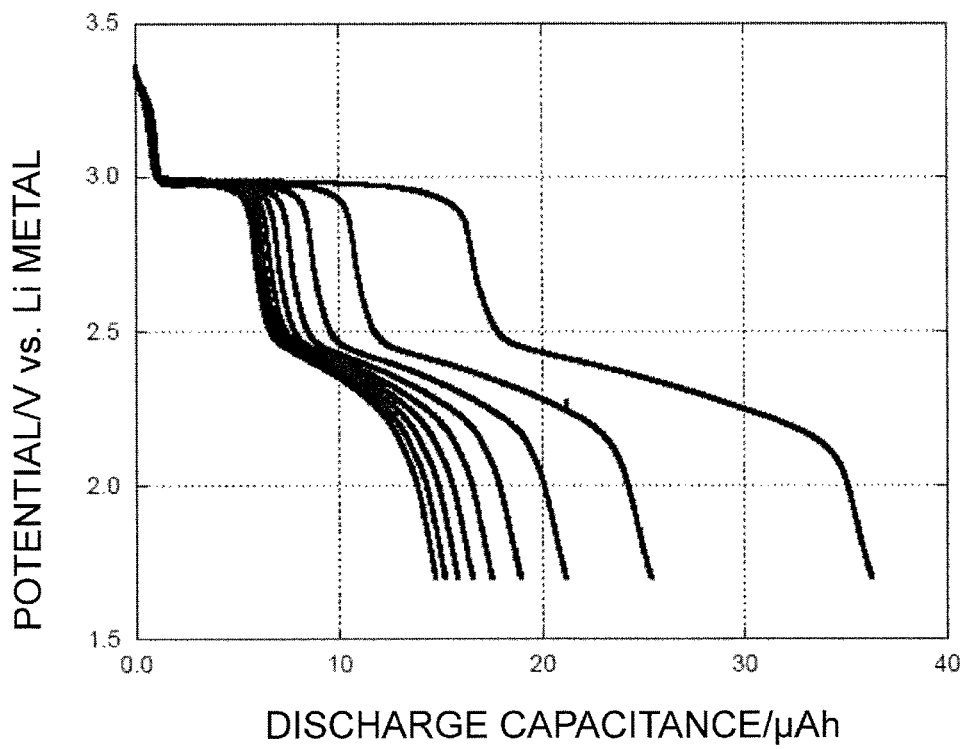
FIG. 11 A graph representing a capacity-discharge potential change observed when a cuprous chloride (CuCl) electrode is charged/discharged with constant current in an LiCl/DEME.BF$_4$ solution.

FIG. 11 shows the discharge curves for the first to ninth cycles. They correspond to the cyclic voltammetry of Example 2, and are discharge curves having flat portions at 3.0 V and 2.5 V, following the small-capacity discharge curve starting at 3.4 V, indicating that chlorine ion ($Cl^-$) can move in and out of metal copper.

Example 9

It was confirmed that an electrode produced by using bismuth chloride ($BiCl_3$) as an active material, as described in Example 3, and charged/discharged with constant current, could be used as a positive electrode of a non-aqueous electrolyte secondary battery, or the like.

A solution of $LiCl/DEME.BF_4=1/10$ was prepared as described in Example 1.

Three electrodes, i.e., a working electrode containing bismuth chloride ($BiCl_3$), and a reference electrode and a counter electrode obtained by attaching lithium foil to a nickel net current collector, were immersed in the solution of $LiCl/DEME.BF_4=1/10$. Then, charging/discharging was performed while conducting a constant current of 10 µA so that the potential of the working electrode was in the range from 1.7 to 3.6 V.

Figure 12:
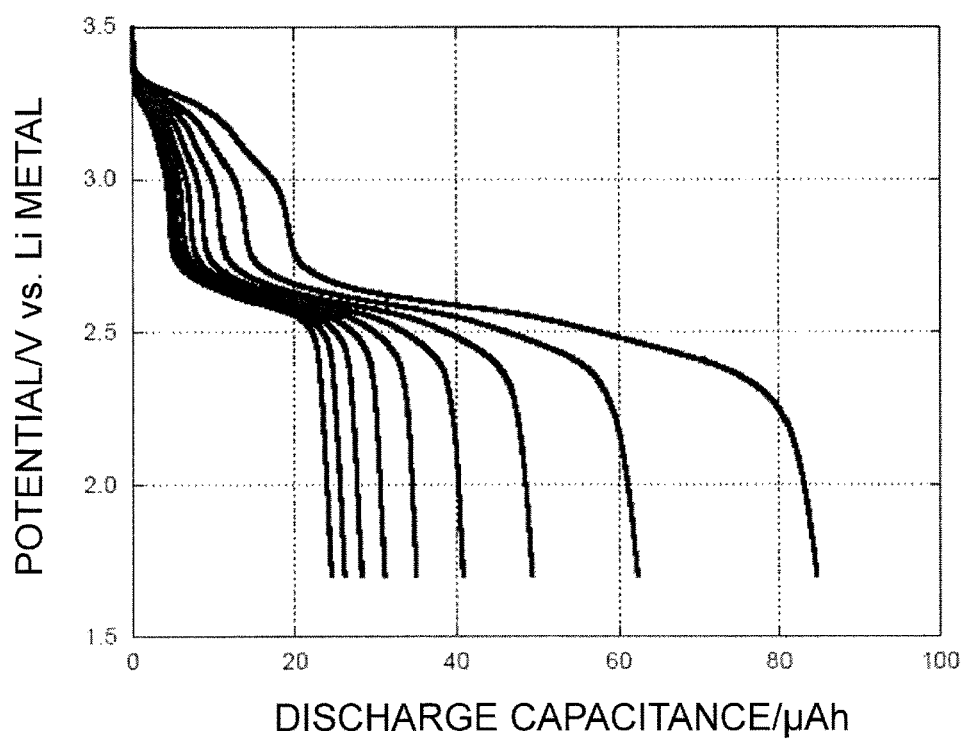
FIG. 12 A graph representing a capacity-discharge potential change observed when a bismuth chloride (BiCl$_3$) electrode is charged/discharged with constant current in an LiCl/DEME.BF$_4$ solution.

FIG. 12 shows the discharge curves for the first to ninth cycles. They correspond to the cyclic voltammetry of Example 3, and are discharge curves having flat portions at 3.3 V and 2.7 V, indicating that chlorine ion ($Cl^-$) can move in and out of metal bismuth.

Example 10

It was confirmed that a hybrid capacitor could be assembled by using a positive electrode using cuprous chloride (CuCl) as an active material and a negative electrode using activated carbon.

The positive electrode using cuprous chloride was produced as described in Example 8.

The reference electrode was produced by attaching a lithium foil to a nickel net current collector.

The negative electrode using activated carbon was produced by kneading an activated carbon powder (abbreviated as AC) having a specific surface area of 1700 $m^2/g$ obtained by using a phenolic resin, acetylene black (abbreviated as AB), and polytetrafluoroethylene powder (abbreviated as PTFE), at a weight ratio of AC/AB/PTFE=80/10/10, and pressing and sticking the product onto a nickel net current collector.

A solution of $LiCl/DEME.BF_4=1/10$ was prepared as described in Example 1.

The three electrodes were immersed in a solution of $LiCl/DEME.BF_4=1/10$, and the hybrid capacitor was charged/discharged, while observing potential changes at the positive electrode and the negative electrode. The conditions were as follows. An oxidation current of 5 µA was conducted through the positive electrode until the potential difference between the positive electrode and the negative electrode becomes 2.1 V, followed by a 10-minute intermission, and then a reduction current of 5 µA was conducted through the positive electrode until the potential difference becomes 0.05 V, followed by a 10-minute intermission.

Figure 13:
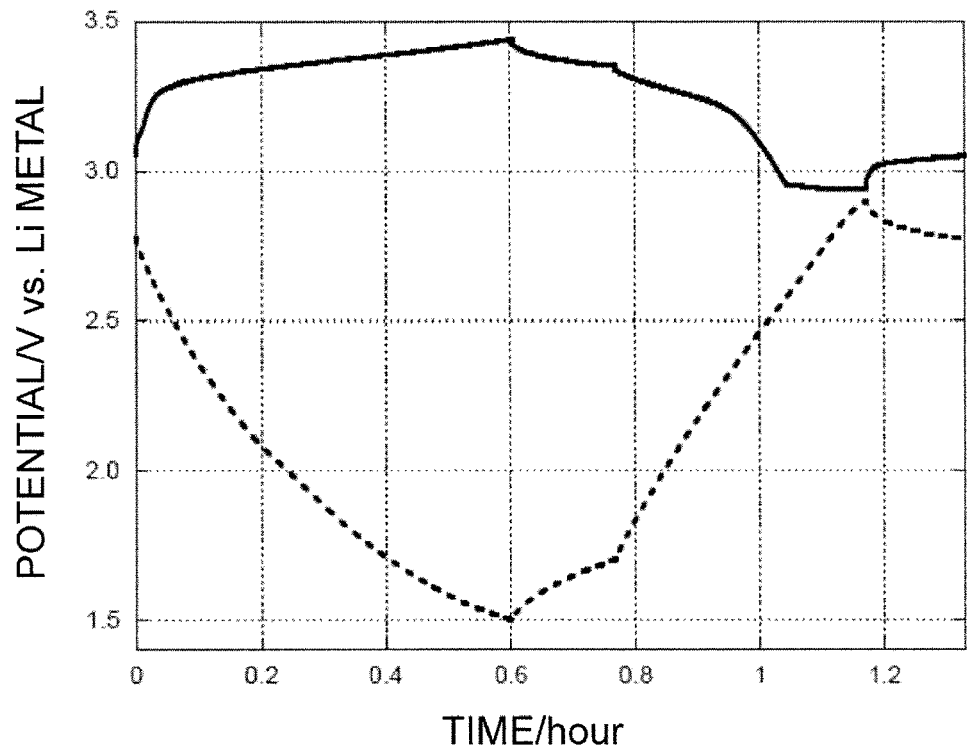
FIG. 13 A graph representing a time-potential change observed when charging and a time-potential change observed when discharging where cuprous chloride (CuCl) is used for the positive electrode and an activated carbon electrode for the negative electrode in an LiCl/DEME.BF$_4$ solution.

FIG. 13 shows potential hanges at the positive electrode and the negative electrode during the fifth cycle. It can be seen that a reaction of taking in chlorine ion ($Cl^-$) so as to turn cuprous chloride (CuCl) into cupric chloride ($CuCl_2$), and a reaction of releasing chlorine ion to return to cuprous chloride, are occurring at the positive electrode. It can be seen that adsorption and desorption of lithium ion ($Li^+$) or $DEME((C_2H_5)_2(CH_3)(CH_3OCH_2CH_2)N^+)$ are occurring at the negative electrode.

INDUSTRIAL APPLICABILITY

Electrochemical energy storage devices disclosed herein are useful as power sources for smartphones, mobile telephones, portable information devices, personal computers, video cameras, portable game devices, etc. They can also be utilized as driving power sources for electric tools, vacuum cleaners, robots, etc., and further as power sources for driving or assisting electric motors in electric vehicles, hybrid electric vehicles, plug-in hybrid electric vehicles, fuel-cell vehicles, etc.

REFERENCE SIGNS LIST

21 Case
22 Positive electrode current collector
23 Positive electrode active material layer
24 Separator
25 Sealing plate
26 Negative electrode active material layer
27 Negative electrode current collector
28 Gasket
29 Non-aqueous electrolyte
31 Positive electrode
32 Negative electrode
101 Coin-type secondary battery

The invention claimed is:
1. An electrochemical energy storage device comprising:
a positive electrode;
a negative electrode; and
a non-aqueous electrolyte in contact with the positive electrode and the negative electrode, wherein:
at least one of the positive electrode and the negative electrode contains a metal halide as an electrode active material;
the non-aqueous electrolyte contains, as a solvent, an ionic liquid of which a component is a cation having an alkoxyalkyl group, and wherein an anion of the ionic liquid includes at least one selected from the group consisting of $(FSO_2)_2N^-$ and $(FSO_2)(CF_3SO_2)N^-$.
2. The electrochemical energy storage device of claim 1, wherein the cation of the ionic liquid contains at least one selected from the group consisting of $(C_2H_5)_2(CH_3)(CH_3OCH_2CH_2)N^+$, $(C_2H_5)_2(CH_3)(CH_3OCH_2CH_2CH_2)N^+$, $(C_2H_5)(CH_3)_2(CH_3OCH_2CH_2)N^+$, $(C_2H_5)(CH_3)_2(CH_3OCH_2CH_2CH_2)N^+$, $(CH_3)(CH_3OCH_2CH_2)N^+(CH_2)_4$, $(CH_3)(CH_3OCH_2CH_2CH_2)N^+(CH_2)_4$, $(C_2H_5)(CH_3OCH_2CH_2)N^+(CH_2)_4$, $(C_2H_5)(CH_3OCH_2CH_2CH_2)N^+(CH_2)_4$, $(CH_3)(CH_3OCH_2CH_2)N^+(CH_2)_5$, $(CH_3)(CH_3OCH_2CH_2CH_2)N^+(CH_2)_5$, $(C_2H_5)(CH_3OCH_2CH_2)N^+(CH_2)_5$, and $(C_2H_5)(CH_3OCH_2CH_2CH_2)N^+(CH_2)_5$.
3. The electrochemical energy storage device of claim 1, wherein the cation of the ionic liquid contains at least one selected from the group consisting of $(C_2H_5)_2(CH_3)$

$(CH_3OCH_2CH_2)N^+$, $(CH_3)(CH_3OCH_2CH_2)N^+(CH_2)_4$, and $(CH_3)(CH_3OCH_2CH_2)N^+(CH_2)_5$.

4. The electrochemical energy storage device of claim 1, wherein the cation of the ionic liquid contains $(C_2H_5)_2(CH_3)(CH_3OCH_2CH_2)N^+$.

5. The electrochemical energy storage device of claim 1, wherein the non-aqueous electrolyte contains an alkali metal halide dissolved in the ionic liquid.

6. The electrochemical energy storage device of claim 5, wherein the alkali metal halide is LiF.

7. The electrochemical energy storage device of claim 5, wherein the alkali metal halide is LiCl.

8. The electrochemical energy storage device of claim 1, wherein the non-aqueous electrolyte contains an alkaline earth metal halide dissolved in the ionic liquid.

9. The electrochemical energy storage device of claim 8, wherein the alkaline earth metal halide is $MgCl_2$.

10. The electrochemical energy storage device of claim 1, wherein the metal halide is a metal fluoride.

11. The electrochemical energy storage device of claim 10, wherein the metal fluoride is $CuF_2$.

12. The electrochemical energy storage device of claim 1, wherein the metal halide is a metal chloride.

13. The electrochemical energy storage device of claim 12, wherein the metal chloride contains at least one of CuCl and $CuCl_2$.

14. The electrochemical energy storage device of claim 12, wherein the metal chloride is $BiCl_3$.

15. The electrochemical energy storage device of claim 12, wherein the metal chloride is $MgCl_2$.

16. The electrochemical energy storage device of claim 1, wherein:
   the positive electrode contains a metal halide as an electrode active material; and
   the negative electrode contains at least one of a metal halide and an alkaline earth metal as another electrode material.

\* \* \* \* \*